United States Patent
Altman

(10) Patent No.: US 11,088,947 B2
(45) Date of Patent: Aug. 10, 2021

(54) DEVICE, SYSTEM, AND METHOD OF PRE-PROCESSING AND DATA DELIVERY FOR MULTI-LINK COMMUNICATIONS AND FOR MEDIA CONTENT

(71) Applicant: LiveU Ltd., Kfar Saba (IL)

(72) Inventor: Baruch Yosef Altman, Pardes Hanna (IL)

(73) Assignee: LIVEU LTD, Kfar Saba (IL)

( * ) Notice: Subject to any disclaimer, the term of this patent is extended or adjusted under 35 U.S.C. 154(b) by 73 days.

(21) Appl. No.: 16/608,836

(22) PCT Filed: May 2, 2018

(86) PCT No.: PCT/IL2018/050484
§ 371 (c)(1),
(2) Date: Oct. 27, 2019

(87) PCT Pub. No.: WO2018/203336
PCT Pub. Date: Nov. 8, 2018

(65) Prior Publication Data
US 2020/0204484 A1 Jun. 25, 2020

Related U.S. Application Data

(60) Provisional application No. 62/501,133, filed on May 4, 2017.

(51) Int. Cl.
*H04L 12/725* (2013.01)
*H04L 12/24* (2006.01)
*H04L 12/707* (2013.01)

(52) U.S. Cl.
CPC .......... *H04L 45/306* (2013.01); *H04L 41/145* (2013.01); *H04L 45/24* (2013.01)

(58) Field of Classification Search
CPC . H04L 45/24; H04L 45/245; H04L 29/06088; H04L 69/14; H04W 28/08; H04W 76/15; H04W 76/20
See application file for complete search history.

(56) References Cited

U.S. PATENT DOCUMENTS 5,280,470 A 1/1994 Buhrke et al.
5,574,970 A 11/1996 Lindquist et al.
(Continued)

FOREIGN PATENT DOCUMENTS

| CA | 2664349 C | 2/2014 |
|---|---|---|
| CN | 1606857 | 4/2005 |

(Continued)

OTHER PUBLICATIONS

Raid Y. Zaghal and Javed I. Khan, "EFSM/SDL modeling of the original TCP standard (RFC793) and the Congestion Control Mechanism of TCP Reno", Jan. 2005; downloaded on Jul. 15, 2019 from: www.medianet.kent.edu/techreports/TR2005-07-22-tcp-EFSM.pdf.
(Continued)

*Primary Examiner* — Eric Nowlin
(74) *Attorney, Agent, or Firm* — Eitan Mehulal Sadot

(57) ABSTRACT

Device, system, and method of pre-processing and data delivery for multi-link communications and for media content. A method for transporting a video content from a content delivery device to a recipient device, includes: inequitably distributing packets of the video content, for transmission across two or more transmitters that transport data to the recipient device over two, different, one-to-one communication links; wherein the distributing of the packets is performed by selecting and applying a particular Packet Distribution Scheme out of a plurality of different pre-stored Packet Distribution Schemes. The Packet Distribution Scheme is selected based on its similarity to actual or predicted performance characteristics of the available trans-
(Continued)

mitters. Optionally, multiple encoded-versions of the video content are prepared in advance, and are stored together with a record indicating which encoded-version should be used in conjunction with which Packet Distribution Scheme.

17 Claims, 1 Drawing Sheet

(56) References Cited

U.S. PATENT DOCUMENTS

| | | | |
|---|---|---|---|
| 5,699,413 A | 12/1997 | Sridhar | |
| 5,771,229 A | 6/1998 | Gavrilovich | |
| 5,918,021 A | 6/1999 | Aditya | |
| 6,154,637 A | 11/2000 | Wright et al. | |
| 6,169,896 B1 | 1/2001 | Sant et al. | |
| 6,288,753 B1 | 9/2001 | DeNicola et al. | |
| 6,496,477 B1 | 12/2002 | Perkins | |
| 6,510,553 B1 | 1/2003 | Hazra | |
| 6,647,015 B2 | 11/2003 | Malkemes et al. | |
| 6,683,877 B1 | 1/2004 | Gibbs et al. | |
| 6,754,872 B2 | 6/2004 | Zhang et al. | |
| 6,757,256 B1 | 6/2004 | Anandakumar et al. | |
| 6,785,330 B1 | 8/2004 | Whealton et al. | |
| 6,788,686 B1 | 9/2004 | Khotimsky et al. | |
| 6,831,574 B1 | 12/2004 | Mills et al. | |
| 6,842,446 B2 | 1/2005 | Everson et al. | |
| 6,904,049 B1 | 6/2005 | Maeda | |
| 6,987,732 B2 | 1/2006 | Gracon et al. | |
| 6,999,432 B2 | 2/2006 | Zhang et al. | |
| 7,013,354 B1 | 3/2006 | Beck et al. | |
| 7,027,415 B1 | 4/2006 | Dahlby et al. | |
| 7,082,221 B1 | 7/2006 | Jiang | |
| 7,151,762 B1 | 12/2006 | Ho et al. | |
| 7,237,032 B2 | 6/2007 | Gemmell | |
| 7,237,033 B2 | 6/2007 | Weigand et al. | |
| 7,292,571 B2 | 11/2007 | Brown | |
| 7,317,750 B2 | 1/2008 | Shattil | |
| 7,324,491 B1 | 1/2008 | Benveniste | |
| 7,327,676 B2 * | 2/2008 | Teruhi | H04L 45/02 370/230 |
| 7,340,764 B2 | 3/2008 | Kubota et al. | |
| 7,542,456 B2 | 6/2009 | Garg et al. | |
| 7,551,671 B2 | 6/2009 | Tyldesley et al. | |
| 7,738,391 B2 | 6/2010 | Melpignano et al. | |
| 7,894,807 B1 | 2/2011 | Drennan | |
| 7,948,933 B2 | 5/2011 | Ohayon | |
| 8,125,989 B2 | 2/2012 | Kissel | |
| 8,165,044 B2 | 4/2012 | Mahajan et al. | |
| 8,204,085 B1 | 6/2012 | Courtney et al. | |
| 8,467,337 B1 | 6/2013 | Ohayon | |
| 8,488,659 B2 | 7/2013 | Ohayon | |
| 8,649,402 B2 | 2/2014 | Ohayon | |
| 8,737,436 B2 | 5/2014 | Ohayon | |
| 8,787,966 B2 | 7/2014 | Altman | |
| 8,811,292 B2 | 8/2014 | Ohayon | |
| 8,848,697 B2 | 9/2014 | Ohayon | |
| 8,942,179 B2 | 1/2015 | Ohayon | |
| 8,942,215 B2 | 1/2015 | Mallet | |
| 8,964,646 B2 | 2/2015 | Ohayon | |
| 8,984,576 B2 | 3/2015 | Sze | |
| 9,042,444 B2 | 5/2015 | Frusina | |
| 9,154,247 B2 | 10/2015 | Altman | |
| 9,203,498 B2 | 12/2015 | Ohayon | |
| 9,237,490 B2 | 1/2016 | Pereira | |
| 9,277,176 B2 | 3/2016 | Khay-Ibbat | |
| 9,338,650 B2 | 5/2016 | Stein | |
| 9,357,427 B2 | 5/2016 | Sze | |
| 9,369,921 B2 | 6/2016 | Altman | |
| 9,379,756 B2 | 6/2016 | Altman | |
| 9,467,384 B2 * | 10/2016 | Zhang | H04L 47/125 |
| 9,538,513 B2 | 1/2017 | Ohayon | |
| 9,692,913 B2 | 6/2017 | Altman | |
| 9,712,267 B2 | 7/2017 | Altman | |
| 9,736,079 B2 | 8/2017 | Sze | |
| 9,756,468 B2 | 9/2017 | Frusina | |
| 9,826,565 B2 | 11/2017 | Ohayon | |
| 9,980,171 B2 | 5/2018 | Stein | |
| 10,027,571 B2 * | 7/2018 | Fedyk | H04L 47/125 |
| 10,091,097 B2 * | 10/2018 | Lin | H04L 69/16 |
| 10,153,854 B2 | 12/2018 | Altman | |
| 10,194,034 B2 | 1/2019 | Altman | |
| 10,206,143 B2 | 2/2019 | Altman | |
| 10,298,957 B2 * | 5/2019 | Dhuse | H04L 45/30 |
| 10,349,462 B2 | 7/2019 | Altman | |
| 10,708,978 B2 * | 7/2020 | Le | H04L 45/22 |
| 10,735,989 B2 * | 8/2020 | Chhibber | H04W 28/0231 |
| 2002/0040479 A1 | 4/2002 | Ehrman et al. | |
| 2002/0054578 A1 | 5/2002 | Zhang et al. | |
| 2002/0071393 A1 | 6/2002 | Musoll | |
| 2002/0146232 A1 | 10/2002 | Harradine et al. | |
| 2002/0154703 A1 | 10/2002 | Kubota et al. | |
| 2002/0174434 A1 | 11/2002 | Lee et al. | |
| 2002/0176482 A1 | 11/2002 | Chien | |
| 2003/0002577 A1 | 1/2003 | Pinder | |
| 2003/0009717 A1 | 1/2003 | Fukushima et al. | |
| 2003/0016770 A1 | 1/2003 | Trans et al. | |
| 2003/0046708 A1 | 3/2003 | Jutzi | |
| 2003/0074554 A1 | 4/2003 | Roach et al. | |
| 2003/0174733 A1 | 9/2003 | Kawai et al. | |
| 2004/0013192 A1 | 1/2004 | Kennedy | |
| 2004/0023652 A1 | 2/2004 | Shah et al. | |
| 2004/0025186 A1 | 2/2004 | Jennings et al. | |
| 2004/0088634 A1 | 5/2004 | Kim et al. | |
| 2004/0098748 A1 | 5/2004 | Bo et al. | |
| 2004/0133917 A1 | 7/2004 | Schilling | |
| 2004/0135879 A1 | 7/2004 | Stacy et al. | |
| 2004/0177155 A1 | 9/2004 | Enokida et al. | |
| 2004/0180696 A1 | 9/2004 | Foore et al. | |
| 2005/0034155 A1 | 2/2005 | Gordon et al. | |
| 2005/0035368 A1 | 2/2005 | Bunyk | |
| 2005/0041586 A1 | 2/2005 | Jiang | |
| 2005/0047363 A1 | 3/2005 | Jiang | |
| 2005/0066033 A1 | 3/2005 | Cheston | |
| 2005/0105815 A1 | 5/2005 | Zhang et al. | |
| 2005/0163093 A1 | 7/2005 | Garg et al. | |
| 2005/0169177 A1 | 8/2005 | Park | |
| 2005/0185621 A1 | 8/2005 | Sivakumar | |
| 2005/0243835 A1 | 11/2005 | Sharma | |
| 2005/0243857 A1 * | 11/2005 | Hofstaedter | H04L 45/04 370/447 |
| 2005/0265383 A1 | 12/2005 | Melpignano et al. | |
| 2006/0015637 A1 | 1/2006 | Chung | |
| 2006/0015917 A1 | 1/2006 | Rozental | |
| 2006/0015924 A1 | 1/2006 | Kortum et al. | |
| 2006/0062242 A1 | 3/2006 | Dacosta | |
| 2006/0062243 A1 | 3/2006 | Dacosta | |
| 2006/0085551 A1 | 4/2006 | Xie et al. | |
| 2006/0088092 A1 | 4/2006 | Chen et al. | |
| 2006/0098573 A1 | 5/2006 | Beer | |
| 2006/0146831 A1 | 7/2006 | Argyropoulos et al. | |
| 2006/0221846 A1 | 10/2006 | Dyck et al. | |
| 2006/0264184 A1 | 11/2006 | Li et al. | |
| 2006/0274773 A1 | 12/2006 | Cohen et al. | |
| 2007/0064811 A1 | 3/2007 | Zador et al. | |
| 2007/0064949 A1 | 3/2007 | Choi et al. | |
| 2007/0083899 A1 | 4/2007 | Compton et al. | |
| 2007/0098007 A1 | 5/2007 | Prodan et al. | |
| 2007/0121678 A1 | 5/2007 | Brooks et al. | |
| 2007/0124773 A1 | 5/2007 | Morris | |
| 2007/0136777 A1 | 6/2007 | Hasek et al. | |
| 2007/0171928 A1 | 7/2007 | Kim et al. | |
| 2007/0183452 A1 | 8/2007 | Hryszko et al. | |
| 2007/0207782 A1 | 9/2007 | Tran | |
| 2007/0207832 A1 | 9/2007 | Gerardi et al. | |
| 2007/0230475 A1 | 10/2007 | Langner | |
| 2007/0247515 A1 | 10/2007 | Roman | |
| 2007/0263072 A1 | 11/2007 | Lochbaum et al. | |
| 2007/0268876 A1 | 11/2007 | Yellin et al. | |
| 2008/0025210 A1 | 1/2008 | Honary et al. | |
| 2008/0034396 A1 | 2/2008 | Lev | |
| 2008/0075031 A1 | 3/2008 | Ohayon | |
| 2008/0285555 A1 | 11/2008 | Ogashara | |
| 2008/0320501 A1 | 12/2008 | Li | |

(56) References Cited

U.S. PATENT DOCUMENTS

| | | |
|---|---|---|
| 2010/0299703 A1 | 11/2010 | Altman |
| 2010/0322259 A1 | 12/2010 | Garg et al. |
| 2012/0039391 A1 | 2/2012 | Frusina |
| 2012/0195259 A1 | 8/2012 | Ohayon |
| 2013/0088961 A1 | 4/2013 | Ramachandran |
| 2013/0142234 A1 | 6/2013 | Ohayon |
| 2013/0145404 A1 | 6/2013 | Ohayon |
| 2013/0155231 A1 | 6/2013 | Ohayon |
| 2013/0227670 A1 | 8/2013 | Ahmad |
| 2013/0242873 A1 | 9/2013 | Ohayon |
| 2013/0276044 A1 | 10/2013 | Ohayon |
| 2013/0301584 A1 | 11/2013 | Addepalli |
| 2013/0310108 A1 | 11/2013 | Altman |
| 2014/0036781 A1 | 2/2014 | Ohayon |
| 2014/0040442 A1 | 2/2014 | Saavedra |
| 2014/0105115 A1 | 4/2014 | Ohayon |
| 2014/0112191 A1 | 4/2014 | Farkas |
| 2014/0220966 A1 | 8/2014 | Muetzel |
| 2014/0269553 A1 | 9/2014 | Stein |
| 2014/0355446 A1 | 12/2014 | Altman |
| 2014/0376370 A1 | 12/2014 | Cioffi |
| 2015/0003465 A1 | 1/2015 | Saavedra |
| 2015/0003466 A1* | 1/2015 | Soffer ............... H04L 47/34 370/412 |
| 2015/0057044 A1 | 2/2015 | Altman |
| 2015/0089020 A1 | 3/2015 | Altman |
| 2015/0124752 A1 | 5/2015 | Ohayon |
| 2015/0163146 A1* | 6/2015 | Zhang ............... H04L 47/125 370/238 |
| 2015/0215738 A1 | 7/2015 | Frusina |
| 2015/0244580 A1 | 8/2015 | Saavedra |
| 2015/0263991 A1 | 9/2015 | Macchiano |
| 2015/0271534 A1 | 9/2015 | Altman |
| 2016/0014176 A1 | 1/2016 | Ariav |
| 2016/0057749 A1 | 2/2016 | Ohayon |
| 2016/0255531 A1 | 9/2016 | Stein |
| 2016/0255541 A1 | 9/2016 | Altman |
| 2016/0261756 A1 | 9/2016 | Altman |
| 2016/0373220 A1 | 12/2016 | Raniere |
| 2017/0086244 A1 | 3/2017 | Ohayon |
| 2017/0195208 A1 | 7/2017 | Kissel |
| 2017/0223572 A1* | 8/2017 | Lee ............... H04W 28/08 |
| 2017/0251515 A1 | 8/2017 | Altman |
| 2017/0264752 A1 | 9/2017 | Altman |
| 2017/0288799 A1 | 10/2017 | Altman |
| 2018/0034724 A1* | 2/2018 | Fedyk ............... H04L 45/24 |
| 2018/0077428 A1* | 3/2018 | Dhuse ............... H04L 1/0045 |
| 2018/0123948 A1* | 5/2018 | Lin ............... H04L 69/16 |
| 2018/0206174 A1* | 7/2018 | Zhou ............... H04L 45/245 |
| 2018/0242185 A1 | 8/2018 | Stein |
| 2019/0059018 A1* | 2/2019 | Chhibber ............... H04L 45/24 |
| 2019/0074919 A1 | 3/2019 | Altman |
| 2019/0089623 A1* | 3/2019 | Dion ............... H04N 21/6118 |
| 2019/0149667 A1 | 5/2019 | Altman |
| 2019/0150035 A1 | 5/2019 | Altman |
| 2019/0312815 A1 | 10/2019 | Altman |
| 2020/0169918 A1* | 5/2020 | Hwang ............... H04L 45/70 |
| 2020/0204484 A1* | 6/2020 | Altman ............... H04L 47/125 |
| 2020/0204659 A1* | 6/2020 | Bosch ............... H04L 69/14 |

FOREIGN PATENT DOCUMENTS

| | | | |
|---|---|---|---|
| CN | 101584157 B | 12/2013 | |
| CN | 103414917 B | 4/2017 | |
| EP | 1976202 A2 | 10/2008 | |
| EP | 2074762 B1 | 4/2015 | |
| EP | 3396908 A1 * | 10/2018 | ............. H04L 45/24 |
| EP | 3396908 B1 * | 7/2019 | ............ H04L 47/193 |
| GB | 2428529 | 1/2007 | |
| IL | 197687 | 7/2013 | |
| JP | H10-41954 | 2/1998 | |
| JP | 2000216815 | 8/2000 | |
| JP | 2000333231 | 11/2000 | |
| JP | 2002010332 | 1/2002 | |
| JP | 2002152310 | 5/2002 | |
| JP | 2002344965 | 11/2002 | |
| JP | 2003152787 | 5/2003 | |
| JP | 2005065207 | 3/2005 | |
| JP | 2005341310 | 12/2005 | |
| KR | 101223950 B1 | 1/2013 | |
| WO | 03 036886 A2 | 5/2003 | |
| WO | 2003098850 | 11/2003 | |
| WO | 2005/048044 A2 | 5/2005 | |
| WO | 2005055524 | 6/2005 | |
| WO | 2005060300 | 6/2005 | |
| WO | 2005109789 | 11/2005 | |
| WO | 2008/038261 A2 | 4/2008 | |
| WO | 2009093252 | 7/2009 | |
| WO | 2011075739 | 6/2011 | |
| WO | 2013/171648 A1 | 11/2013 | |
| WO | 2014/036640 A1 | 3/2014 | |
| WO | 2014/055680 A2 | 4/2014 | |
| WO | 2015/188935 A1 | 12/2015 | |
| WO | 2018/203336 A1 | 11/2018 | |
| WO | WO-2018203336 A1 * | 11/2018 | ........... H04L 41/145 |

OTHER PUBLICATIONS

Quentin De Coninck and Olivier Bonaventure, "Multipath QUIC: Design and Evaluation", 13th International Conference on emerging Networking EXperiments and Technologies (CoNEXT 2017), Dec. 12-15, 2017; Downloaded from: https://multipath-quic.org.

International Search Report for PCT application PCT/IL2017/051331, dated Mar. 13, 2018.

Written Opinion of the International Searching Authority for PCT application PCT/IL2017/051331, dated Mar. 13, 2018.

Wikipedia, "TCP Congestion Control", downloaded from the Internet on Jul. 14, 2019 from: https://en.wikipedia.org/wiki/TCP_congestion_control.

Wikipedia, "Head-of-line blocking", downloaded from the Internet on Jul. 15, 2019 from: https://en.wikipedia.org/wiki/Head-of-line_blocking.

Wikipedia, "Multipath TCP", downloaded from the Internet on Jul. 15, 2019 from: https://en.wikipedia.org/wiki/Multipath_TCP.

Wikipedia, "Transmission Control Protocol", printed on Jul. 16, 2019 from: https://en.wikipedia.org/wiki/Transmission_Control_Protocol.

The Internet Engineering Task Force (IETF), "TCP Congestion Control", Request For Comments (RFC) 5681, Sep. 2009.

Information Sciences Institute—University of Southern California, "Transmission Control Protocol", Request For Comments (RFC) 793, Sep. 1981.

Information Sciences Institute—University of Southern California, "Internet Protocol", Request For Comments (RFC) 791, Sep. 1981.

Network Working Group, "TCP Extensions for High Performance", Request For Comments (RFC) 1323, May 1992.

Network Working Group, "TCP Selective Acknowledgment Options", Request For Comments (RFC) 2018, Oct. 1996.

Network Working Group, "The TCP Maximum Segment Size and Related Topics", Request For Comments (RFC) 879, Nov. 1983.

Internet Engineering Task Force (IETF), "The NewReno Modification to TCP's Fast Recovery Algorithm", Request For Comments (RFC) 6582, Apr. 2012.

Network Working Group, "TCP Slow Start, Congestion Avoidance, Fast Retransmit, and Fast Recovery Algorithms", Request For Comments (RFC) 2001, Jan. 1997.

Network Working Group, "Increasing TCP's Initial Window", Request For Comments (RFC) 3390, Oct. 2002.

Network Working Group, "TCP Extensions for Long-Delay Paths", Request For Comments (RFC) 1072, Oct. 1988.

Network Working Group, "TCP Congestion Control", Request For Comments (RFC) 2581, Apr. 1999.

Internet Engineering Task Force (IETF), "TCP Extensions for Multipath Operation with Multiple Addresses", Request For Comments (RFC) 6824, Jan. 2013.

Internet Engineering Task Force (IETF), "Coupled Congestion Control for Multipath Transport Protocols", Request For Comments (RFC) 6356, Oct. 2011.

(56) References Cited

OTHER PUBLICATIONS

Internet Engineering Task Force (IETF), "Architectural Guidelines for Multipath TCP Development", Request For Comments (RFC) 6182, Mar. 2011.
Internet Engineering Task Force (IETF), "Multipath TCP (MPTCP) Application Interface Considerations", Request For Comments (RFC) 6897, Mar. 2013.
Internet Engineering Task Force (IETF), "Use Cases and Operational Experience with Multipath TCP", Request For Comments (RFC) 8041, Jan. 2017.
Institute of Electrical and Electronics Engineers (IEEE), "Part 3: Carrier sense multiple access with collision detection (CSMA/CD) access method and physical layer specifications", Standard 802.3, Mar. 2000 Edition; Clause 43, "Link Aggregation", pp. 1254 to 1317.
Institute of Electrical and Electronics Engineers (IEEE), "Information technology—Telecommunications and information—exchange between systems—Local and metropolitan area networks—Specific requirements—Part 1AX: Link Aggregation", IEEE standard 802.1AX, First Edition, Jan. 15, 2016; "Table of Contents", pp. (i) to (xx).
Written Opinion of the International Searching Authority in PCT/IL2018/050484, dated Aug. 9, 2018.
Machine Translation of JP 2002010332 Generated online at Japanese patent office website on May 1, 2013.
Machine Translation of JP 2005065207 Generated online at Japanese patent office website on May 1, 2013.
Machine Translation of JP 2002344965 Generated online at Japanese patent office website on May 1, 2013.
Machine Translation of JP 2003152787 Generated online at Japanese patent office website on May 21, 2014.
Machine Translation of JP 2005341310 A Obtained from "Google Patents" on Jul. 23, 2019.
Machine Translation of JP 2000216815 A Obtained from "Google Patents" on Jul. 23, 2019.
Machine Translation of JP H 10-41954 A Obtained from "Google Patents" on Jul. 23, 2019.
Machine Translation of JP 2000333231 A Obtained from "Google Patents" on Jul. 23, 2019.
Machine Translation of JP 2002152310 A Obtained from "Google Patents" on Jul. 23, 2019.
Machine Translation of CN 1606857 A Obtained from "Google Patents" on Jul. 23, 2019.
Bibliographical Data and Abstract of HK 1137278 (A1) Printed from Espacenet on Jul. 23, 2019.
Masayoshi Kobayashi et al., "Maturing of Open Flow and Software-defined Networking through deployments", Computer Networks 61 (2014) 151-175.
Ford et al., "TCP Extensions for Multipath Operation with Multiple Addresses", Internet Engineering Task Force (IETF), draft IETF mptcp rfc-6824-bis-09, Jul. 28, 2017.
Internet Engineering Task Force (IETF), "Threat Analysis for TCP Extensions for Multipath Operation with Multiple Addresses", Request for Comments (RFC) 6181, Mar. 2011.
Internet Engineering Task Force (IETF), "Analysis of Residual Threats and Possible Fixes for Multipath TCP (MPTCP)", Request for Comments (RFC) 7430, Jul. 2015.
International Search Report in PCT/IL2018/050484, dated Aug. 9, 2018.

\* cited by examiner

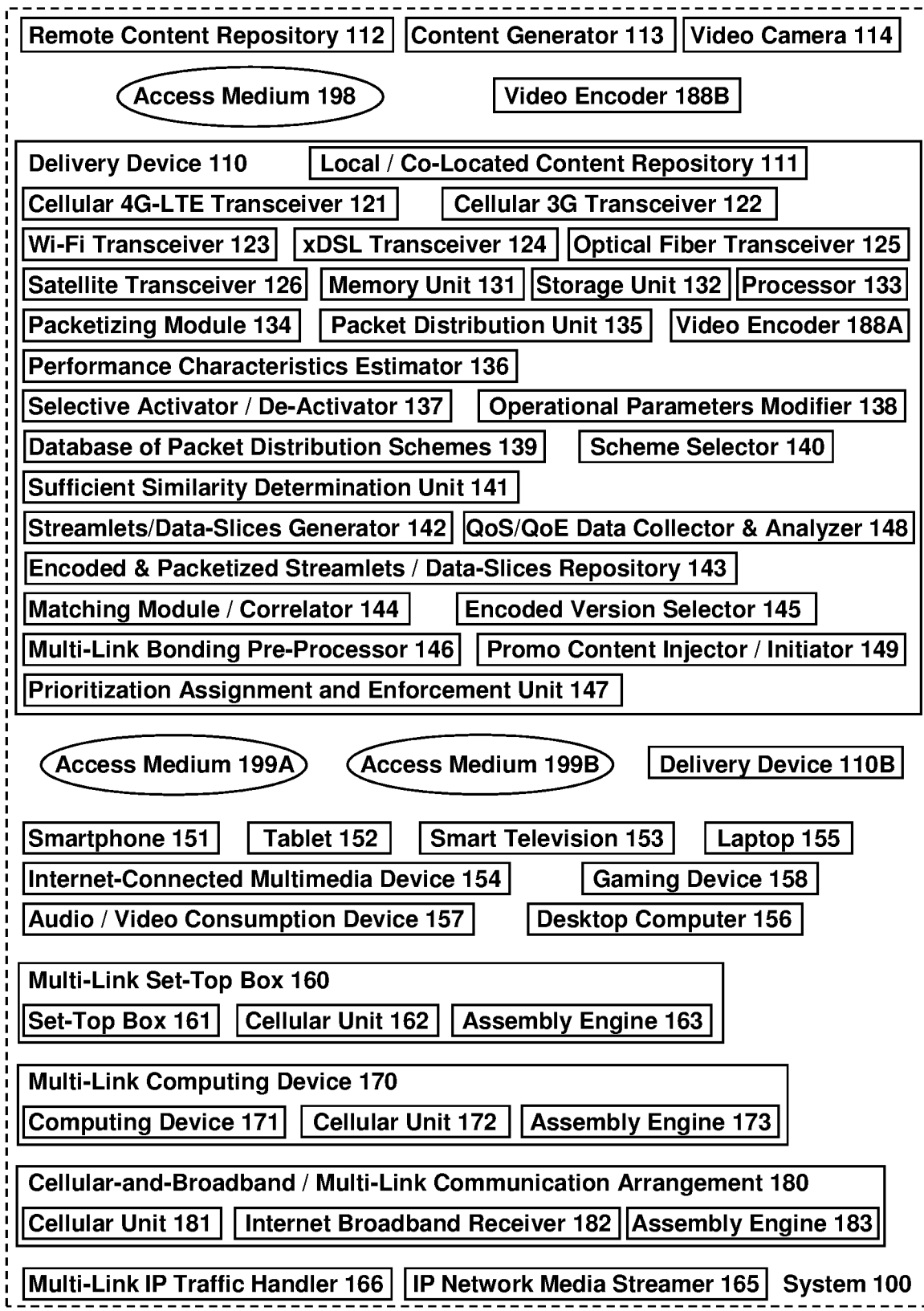

DEVICE, SYSTEM, AND METHOD OF PRE-PROCESSING AND DATA DELIVERY FOR MULTI-LINK COMMUNICATIONS AND FOR MEDIA CONTENT

CROSS-REFERENCE TO RELATED APPLICATIONS

This patent application is a national stage of PCT international application number PCT/IL2018/050484, having an international filing date of May 2, 2018, published as international publication number WO 2018/203336 A1, which is hereby incorporated by reference in its entirety; which claims benefit and priority from United States provisional patent application number U.S. 62/501,133, filed on May 4, 2017, which is hereby incorporated by reference in its entirety.

FIELD

The invention relates to the field of telecommunications.

BACKGROUND

Millions of people utilize electronic devices and computing devices on a daily basis, for business uses as well as for personal uses and entertainment. For example, many users utilize a desktop computer, a laptop computer, a smartphone, or a tablet in order to browse the Internet, send and receive electronic mail (Email) messages, send and receive files, engage in Instant Messaging (IM), participate in video conferences, play games, compose documents, capture images, and perform other tasks and activities.

SUMMARY

The present invention comprises devices, systems, and methods of pre-processing and data delivery for multi-link communications and for media content. For example, a method for transporting a video content from a content delivery device to a recipient device, includes: inequitably distributing packets of the video content, for transmission across two or more transmitters that transport data to the recipient device over two, different, one-to-one communication links; wherein the distributing of the packets is performed by selecting and applying a particular Packet Distribution Scheme out of a plurality of different pre-stored Packet Distribution Schemes. The Packet Distribution Scheme is selected based on its similarity to actual or predicted performance characteristics of the available transmitters. Optionally, multiple encoded-versions of the video content are prepared in advance, and are stored together with a record indicating which encoded-version should be used in conjunction with which Packet Distribution Scheme.

BRIEF DESCRIPTION OF THE DRAWINGS

FIG. 1 is a schematic illustration of a system, in accordance with some demonstrative embodiments of the present invention.

DETAILED DESCRIPTION OF SOME DEMONSTRATIVE EMBODIMENTS OF THE PRESENT INVENTION

Reference is made to FIG. 1, which is a schematic illustration of a system 100, in accordance with some demonstrative embodiments of the present invention.

For example, a delivery device 110 may deliver or transport content to one or more recipient devices 151-157. The device 110 may be a server computer, which may comprise a local or a co-located content repository 111, and/or which may have access to a remote content repository 112, and/or a local repository including cache, and/or which may be connected to (or associated with) a content generator 113, such as a video camera 114 or other able to capture or feed audio and video or other audio/video acquisition unit.

Optionally, an access medium 198 (or, multiple such access mediums, of the same types or of different types) may be used by the Delivery Device 110, to access the content stored in the remote content repository 112; for example, a shared access medium, a non-shared access medium, a wired link, a wireless link, a data cable, fiber optics, the public Internet, a Virtual Private Network (VPN), an organizational network, an enterprise network, a LAN or W-LAN, or the like. The remote content repository 112 may be of one or more types; for example, a stream video and/or streaming audio service or server or repository (e.g., similar to YouTube or Netflix); a content repository within (or operated by) a tele-communications operator or Telco or a Mobile Network Operator (MNO); a content repository within (or operated by) an Internet Service Provider (ISP) or a telephony service provider or other communication service provider; a content repository of a Content Delivery Network (CDN) (e.g., similar to Akamai); or any other content repository or content provider entity along the way from the point at which the content is generated and/or created and/or captured and/or encoded, to the end-point and through the "last mile" infrastructure service provider or any node or network element between them.

The device 110 comprises, or is associated with, two or more networks or core networks or access networks or elements such as gateways or routing elements or IP addresses or nodes into such networks or similar; for example, a cellular 5G or 4G-LTE network 121, a cellular 3G network 122, a Wi-Fi network 123, a Digital Subscriber Line (DSL) network 124 (such as, DSL or ADSL or R-ADSL or HDSL or IDSL or SDSL or VDSL, any of which may be referred to as "xDSL"), an optical fiber network 125, a satellite communications network 126, and/or other suitable network elements.

The device 110 may further comprise a memory unit 131 (e.g., RAM, Flash memory) and/or a storage unit 132 (e.g., Hard Disk Drive (HDD), Solid State Drive (SDD), Flash-based storage unit), able to store (e.g., for short term and/or for long term) data, raw data, processed data, meta-data, program code, machine-readable instructions, one or more applications, and/or other data.

The device 110 further comprises a processor 133, for example a Central Processing Unit (CPU), a Digital Signal Processor (DSP), a Graphics Processing Unit (GPU), one or more processing cores, an Integrated Circuit (IC), an Application-Specific IC (ASIC), or the like. The processor 133 may execute code or instructions, for example, that are stored in memory unit 131 and/or storage unit 132; and may command or control other units or module of the device 110.

The content to be transmitted or transported may be or may comprise, for example, video, audio, audio-and-video, a video clip, a video item, streaming video, a video file, rich media content, Virtual Reality (VR) content, Augmented Reality (AR) content, 360-degrees video content, multiple-angles video content, multiple-feeds or multiple cameras or other media sources, or the like. The content may be stored in raw format (e.g., as a sequence of discrete frames or discrete images), in compressed format and/or in encoded format.

The content is delivered or transported from the device, directly to one or more recipient devices, or indirectly over one or more intermediary network elements, such as a network switch, network hub, network router, relay elements, re-transmitter, proxy server(s), and/or other network nodes or network elements or multiple hops or segments and hierarchies of such, using any IP protocol stacks, transports, PHYs, MACs, and/or other underlying IP packet delivery mechanisms of the relevant network segments. In some embodiments, device 110 intends to deliver the content to more than a single recipient or end-point or end-node or destination IP or destination MAC or other destination ID; for example, to two or more home set-top boxes for viewers watching the same live football match. The IP delivery device may use multicast or broadcast towards these set-top boxes. The routing or networking mechanism and protocols may be multicast-based or broadcast-based, e.g., single content delivered to multiple receivers using IP address schemes; or, it may use multiple unicasts, a separate one for each destination address; or a combination of both unicast and/or multicast and/or broadcast.

The content is transported or delivered, at least during a portion of the transport or the delivery, over an access medium or over multiple such access mediums (199A, 199B, or the like); e.g., a shared access medium, a non-shared access medium, the public Internet, a cellular communication network, a satellite communication network, a wired communication network, a fiber optic network, a cable network, a telephone network, a wireless communication network, or the like. The multiple access mediums 199A and 199B may be of the same type, or of different types (e.g., cellular and Wi-Fi), or may be of the same type but with different technologies (e.g., cellular 3G and cellular 4G-LTE).

For demonstrative purposes, portions of the discussion herein may relate to a single Delivery Device 110; however, the present invention may further comprise, or may similarly be utilized with, two or more such delivery devices which may operate in parallel or concurrently (e.g., Delivery Device 110 and Delivery Device 110B), using the same or using different access medium(s) and/or using the same or different types of communication links; delivering the same content item, or delivering different content items; delivering such content item(s) to the same recipient or to different recipients; delivering such content item(s) simultaneously or concurrently, or at different time-slots; or the like.

In some embodiments, a particular content-item such as a particular video, or a segment or a slice or a part of a video, or a packet of compressed and split video or other media item, is transported or transmitted to a particular recipient device, using a point-to-point or a one-to-one transport or transmission or using a one-to-one communication channel, which may by itself utilize or comprise two or more communication links that are used in parallel or concurrently; this is a unicast, for example such that the destination is a home set-top box associated with a cellular modem with a service package and SIM or other authorization credentials or authentication credentials from a specific cellular provider or operator, and another transceiver (or transmitter) to a fixed network operator such as cable or satellite or xDSL. The two transceivers (or modems, or transmitters) have different IP addresses as they are IP elements within different networks. Even if they were on the same network, such as two cellular modems of the same operator, they would still have two different IP addresses. The smart TV or laptop or router connected to them may have its own IP address within the network of an ISP, or another service provider. The part of the content is then destined to a specific transceiver (e.g., a specific receiving unit having a specific IP address) of the two or more transceivers. When relevant packets arrive at the end bonding processor associated with these two transceivers, it decapsulates them from any bonding-specific delivery protocol encapsulation and forwards them to their relevant IP destination according to the address in the decapsulated packets. The decapsulated destination address may be using a multicast or a broadcast or a unicast addressing schemes; but the split delivery, or the distributed delivery, or the divided delivery, or the bonded delivery, from device 110 or anywhere along the route or routes from it, is done using multi-link bonding, e.g., sending it to a specific address or several of them. Multicast or broadcast may be used underneath the bonding protocol and encapsulation, as may unicast, or above it—further encapsulating in multicast or broadcast or unicast IP schemes the bonding encapsulated packets; The bonding IP transport scheme and protocol may be proprietary, such that allows splitting or dividing or distributing the content over multiple network operators at the application layer, or standard bases, such as Multi-Path TCP (MPTCP) or Multi-Path QUIC (MPQUIC) or others, with their particular features and/or limitations (such as, not supporting splitting to more than two networks, or not supporting two different network operators, or any other limitation or benefit or feature).

The recipient devices may be or may comprise, for example, a smartphone 151, a tablet 152, a smart television 153, an Internet-connected multimedia device 154 (e.g., Internet-connected screen, Internet-connected "streamer" unit or video-streaming apparatus), a laptop computer 155, a desktop computer 156, an audio/video consumption device 157, a gaming device 158, multi-link modem or transceiver or transmitter or content delivery unit, router or another network element, set-top box, video head-end (in the street serving multitude of end nodes), Access Point, or the like. Each one of the recipient devices may comprise one or more wireless and/or wired transceivers or modems, able to receive the incoming content (e.g., compressed and encapsulated video packets).

In accordance with the present invention, a content item, a video item, segment, DAS HTTP initiated video part or similar invoked part, packets representing it in any way, a streaming video, or other content is intended to be transported or delivered to a particular recipient device, or to several such particular recipient devices (over discrete and separate point-to-point communication paths, or over a multiplicity of discrete and separate one-to-one communication sessions between the transmitting entity 110 and each separate one of the recipient devices).

The device 110 has access to the content, which is stored locally and/or remotely, or which the device firstly obtains from a remote repository. For example, the content may be an HEVC H.265, or AV1, or webRTC, or MPEG-4 or MP4 video file, containing video frames of various types (e.g., I-Frames, P-Frames, B-Frames). The content may be packetized, for example, already obtained by the Device 110 as a set of data-packets, or the Device 110 may utilize its own Packetizing Module 134 to perform packetization of to divide the content into discrete packets. As a demonstrative and non-limiting example, a 64-kilobyte I-Frame may be packetized to consist of 50 data packets of 1,316 bytes per data-packet; an 8-kilobyte P-Frame may be packetized to consist of 9 packets of 900 bytes per data-packet; and so forth. Each packet may comprise a header or other component, particularly storing a Sequence Number (SN) indicator and/or a Timing indicator which indicate the particular location or offset or timing of that packet relative to other packet(s) or relative to a fixed time-point or value. In a demonstrative example, the packets of a video content are sequentially numbered with integer and consecutive Sequence Numbers (SNs), such as 1, 2, 3 and so forth; in other implementations, other types of numbering (e.g., not necessarily consecutive) may be utilized.

Instead of the traditional method of sending or delivering all the packets in a serial manner, one packet after another packet in their original order based on their Sequence Numbers, via a single transmitter on a single network, the Device 110 of the present invention operates differently: it utilizes a Packet Distribution Unit 135 selectively, and generally inequitably or un-evenly, distribute the data-packets for transmission to (or over, or across, or via) two or more networks or routes including at least one wireless section on at least one of these routes when both are on the same network or communication links, which then transmit or transport their allocated packets, not necessarily synchronized between the two or more connections, or at least partially simultaneously yet without the need for synchronization or knowledge of one another, or during at least a partially-overlapping time-window), to a particular recipient device or end-node destination IP address.

For example, the content item is packetized into 5,000 data packets, which correspond to 5 minutes of video content. The packets may have the same packet-size, or which may have different packet-sizes. The Packet Distribution Unit 135 determines, for example, that the first 1,000 packets, that are numbered from Packet 0001 to Packet 1000, correspond to the first minute of the video. The Packet Distribution Unit 135 distributes these 1,000 data packets, for transmission or transport to the recipient device, as follows: Packets 0001 through 0200 are allocated to be transmitted via the Cellular 5G network or core network or access network or mobile network or route towards the 5G Transceiver 121; Packets 0201 through 0500 are allocated to be transmitted (e.g., generally in parallel) via the xDSL network towards the end node xDSL Transceiver 124; and Packets 0501 through 1000 are allocated be transmitted (e.g., generally in parallel) via the Optical Fiber network segment towards the Optical Fiber Transceiver 125. These three transceivers then proceed to send or transmit, to the recipient device, the packets allocated to them, each one of them may be implemented separately via a point-to-point or a one-to-one connection towards the same recipient device (e.g., having the same Recipient IP address). It is noted that the term "transceiver" as used here may be or may comprise any suitable transmitting unit, transmitter, transmitter-and-receiver, modem, content delivery unit, or the like.

The actual performance characteristics of each one of the used or available transmitters or transceivers or modems or packets delivery devices, may change or may fluctuate over time, due to various reasons; such as, due to imperfections of the modem or transceiver itself, due to weather conditions that may affect a wireless medium, due to network congestion, due to network failures (e.g., a particular cellular tower is physically damaged), and/or other factors or reasons which may not necessarily be predictable. The Device 110 may utilize a Transceiver/Modem/Delivery connection/Link Performance Characteristics Estimator 136, to estimate or to measure or to calculate the current and/or actual and/or most-recent and/or predicted characteristics of the performance of each one of the available and/or the utilized transceivers/modems/communication links Optionally, the Performance Characteristics Estimator 136 may utilize, or may take into account, feedback or responses or signals or messages received from the recipient device and/or from the network itself and/or from one or more layer or elements of the network; e.g., via a back-channel, or feedback loop, or as Acknowledgement (ACK) signals or packets, or as Negative Acknowledgement (NACK) signals or packets, or as retransmission request(s) from the network or from the recipient device, or from error codes or error messages received from the recipient device or the network(s) used, or from an analysis or from signals that indicate buffering events and/or latency and/or lagging and/or delays and/or missing packets and/or dropped packets and/or erroneous packets and/or lost packets, or the like.

For example, the Performance Characteristics Estimator 136 may determine or may estimate, that the current performance (e.g., reliable and/or useful and/or effective and/or actual bandwidth or throughput or goodput) of the Cellular 4G-LTE or 5G Transceiver 121 is degraded or is decrease d relative to a threshold value or relative to past or recent performance of that transceiver or extrapolations or interpolation or other mathematical deduction methods; and that the current performance (e.g., reliable and/or useful and/or effective and/or actual bandwidth or throughput or goodput) of the Optical Fiber Transceiver 125 is stable or is even increased.

Based on the analysis or the estimates of the Performance Characteristics Estimator 136, the Device 110 may utilize its Packet Distribution Scheme Modification Unit 137 to classify or to characterize the performance of the links, and/or to modify the packet distribution scheme that was applied so far; for example, by setting a new, different, ratio of distributing the next 1,000 packets, to the three delivery devices that were used; such as, by allocating to the Cellular 5G or 4G-LTE delivery device or transceiver 121 only 120 packets (Packets number 1001 through 1120) in the next batch of 1,000 packets that is intended for transmission (e.g., instead of 200 packets that were allocated to the Cellular 5G or 4G-LTE Transceiver 121 in the first batch of 1000 packets); and by increasing the allocation of packets to the Optical Fiber Transceiver 125 from 500 packets in the previous batch to 580 packets in the next batch; and so forth.

The Performance Characteristics Estimator 136 may analyze or estimate the performance of any one of the already-transmitting or the already-utilized modems or transceivers or deliver units or delivery elements or communication links; and, may also analyze or estimate the performance of any not-currently-transmitting or not-currently-utilized modem or transceiver or communication link Based on such analysis or estimations, the Device 110 may classify the links or delivery devices, for that particular time duration or for extrapolated time duration, as well as for other extrapolated links not participating in that delivery or in that analysis at all, including for future delivery links or for candidate deliver links Device 110 may also utilize its Selective Activator/De-Activator Unit 137 to selectively activate or de-activate a particular modem or transceiver, such as, to selectively de-activate a modem or transceiver that exhibits reduced or inadequate or insufficient performance characteristics, e.g., in absolute values, or in relative values, or relative to a pre-defined threshold value, or relative to a pre-defined range-of-values, or relative to the performance of another modem or transceiver, or relative to the previous or the past or the most-recent performance of that same modem or transceiver; or, to selectively activate a not-yet-utilized or a not-currently-utilized modem or transceiver, or the like.

Additionally or alternatively, based on such analysis or estimations, the Device 110 may utilize its Operational Parameters Modifier Unit 138 to selectively instruct a particular modem or transceiver to change, increase or decrease one or more of its operational parameters or configuration; for example, to send more (or less) Forward Error Correction (FEC) signals or packets or data, to reduce its transmission rate, to increase its transmission rate, or the like.

In some embodiments, optionally, based on such analysis or estimations by the Performance Characteristics Estimator 136, the Operational Parameters Modifier Unit 138 may further instruct a Video Encoder (e.g., a video encoder 188A of or within the Device 110, or co-located with the Device 110, or a remote or a separate Video Encoder 188B that is operably associated with the Device 110 or that is remotely controlled by device 110 or that is remotely configurable via commands from device 110 or that is associated with the content generator 113 and/or with the video camera 114 and/or with the remote content repository 112 and/or with components of a Content Delivery Network (CDN) or the like) to modify one or more of its encoding parameters; for example, to increase (or to decrease) the encoding bitrate, to increase (or to decrease) the video resolution, to increase (or to decrease) the sampling rate of video or audio, to change an encoding scheme or a compression scheme (e.g., from H.264 to H.265), to change the Frames Per Second (FPS) at which the video is encoded, to perform re-encoding or trans-coding of the video (or portions thereof) into or using a different encoding scheme, or the like.

At the recipient device, two or more transceivers (e.g., wired transceivers and/or wireless transceivers), of the same type and/or of different types, operate to receive the incoming data packets (e.g., video packets), which may typically arrive in non-sequential order. The incoming packets are stored or placed in a local buffer or memory unit of the recipient device; and the Assembly Engine of the recipient device operates to re-construct the video-stream or the data-stream or a playable video item from the incoming data packets, for example, by ordering and/or re-arranging them and/or re-shuffling them and/or moving them within the buffer in accordance with the Sequence Number (SN) or the Timing indicator of each packet, and/or by copying them or moving them to another buffer at the right order; thereby creating or re-constructing the ordered set of video packets in their correct order. A video player or video playback module or content playback module in the recipient device operates to playback the video content, for example, by outputting video frames to a screen and by outputting audio signals via an audio output unit (e.g., audio speakers, earphones, headphones, audio out socket). The re-assembly of the video stream at the recipient device, may be performed in real time or in near-real-time; for example, the recipient device may receive (out of order) the packets numbered 0001 to 1000, may rapidly re-arrange them into their correct order, may output them internally within the recipient device to the video player for playback, and while the video player indeed plays the 60 seconds of video (from the re-arranged video packets numbered 0001 to 1000), the recipient device, in parallel, continues to receive additional incoming video packets that correspond to the subsequent portion(s) of the video being transported to the recipient device, and then re-constructs from those additional video packets the continuing portion of video segment for playback, and so forth.

The recipient device may optionally send feedback or control messages back to the device 110, at the application level and/or at one or more layers or levels of the communication session(s) being utilized; for example, in order to report missing packets or lost packets or dropped packets or erroneous packets, to report ACK or NACK of packets or of other messages, to report about latency or lagging or delay in the playback, to report about occurrence of buffering events at the video player of the recipient device and/or about the length and/or frequency of such buffering events, to report about artifacts (e.g., their existence, their frequency, their on-screen location, their number, the area that they cover, or the like), to report about the actual PFS being displayed, to report about one or more imperfections or problems with regard to the audio/video reception and/or playback and/or consumption and/or stream-assembly and/or packet-ordering process, to request re-transmission of packet(s) and/or video-segment(s), to report actual or measured or estimated or predicted performance characteristics of one or more transceivers or modems utilized by the recipient device for reception, and/or other feedback data or control data that may then be utilized by the Device 110 in order to modify the packet distribution scheme among modems/transceivers/links, and/or in order to modify the utilization of one or more of the modems/transceivers/links, and/or in order to modify one or more configurational parameters or operational parameters of one or more of the modems/transceivers/links of the Device 110 or of one or more other units or parameters of the Device 110 (e.g., video encoder; buffer size; logical window(s) size(s) being used; or the like).

In a demonstrative implementation, one of the recipient devices may be a Cellular-Enabled (or cellular augmented) or a Multi-Link Network Enabled Set-Top Box 160 (or an IP Network Media Streamer 165 or a Multi-Link IP Traffic Handler 166 such as a router, switch, hub, access point, relay node, repeater, or the like), which comprises for example: a home or office or enterprise cable-box or set-top box 161 or local communication gateway comprised of a modem to the fixed network and any type of a network level element or satellite-associated box, which receives incoming data (e.g., incoming video, incoming digital video) via a wired communication link (e.g., from a local cable company), or a satellite link, or another fixed connection including cellular-access, wherein the set-top box 161 is further associated with or operably connected to a nearby or a co-located cellular unit 162 (e.g., a smartphone, or a tablet equipped with a cellular transceiver, or other unit which comprises a cellular transceiver); such that (as further discussed herein) a first portion of the packets of an incoming video is transported and is received over a fixed connection communication link, whereas a second portion of the packets of the incoming video is transported (e.g., concurrently, at least partially in parallel) via a cellular communication link; and such that an Assembly Engine 163 at such apparatus (160) assembles or re-assembles or re-constructs a video-stream from the incoming packets that are received (typically received out-of-order) from the two communication paths.

In another demonstrative implementation, one of the recipient devices may be a Cellular-Enabled (or cellular augmented) or a Multi-Link Network Enabled Computing Device 170, which comprises: a computing device 171 such as a laptop computer or a desktop computer, which receives incoming data (e.g., incoming video, incoming digital video) via a wired or another fixed communication link (e.g., from a local Internet Service Provider (ISP), such as via an xDSL modem or a cable-box or a satellite modem or set-top box or router or another network device or a wireless Access Point associated with any of these), wherein the computing device 171 is further associated with or operably connected to a nearby or a co-located cellular unit 172 (e.g., a smartphone, or a tablet equipped with a cellular transceiver, or other unit which comprises a cellular transceiver); such that (as further discussed herein) a first portion of the packets of an incoming video is transported and is received over a wired communication link, whereas a second portion of the packets of the incoming video is transported (e.g., concurrently, at least partially in parallel) via a cellular communication link; and such that an Assembly Engine 173 at such apparatus (170) assembles or re-assembles or re-constructs a video-stream from the incoming packets that are received (typically received out-of-order) from the two communication paths.

In yet another demonstrative implementation, one of the recipient devices may be a Cellular-and-Broadband/Multi-Link Communication Arrangement 180, which comprises: a Cellular Unit 181, such as a smartphone or a tablet that is equipped with a cellular transceiver, and which receives incoming data packets via a cellular communication link; wherein the Cellular unit 181 is further associated with or operably connected to a nearby or a co-located non-cellular device such as an Internet Broadband Receiver 182 (e.g., implemented as an xDSL modem, or a cable-box or a set-top box, which are connected over a fixed or wired or wireless connection to a local Internet Service Provider (ISP) that provides wired Internet broadband service; or, implemented as a satellite-based Internet receiver or another wireless-based Internet receiver or transceiver or modem which is connected via wireless link or satellite link to a satellite-based Internet Service Provider (ISP), or other suitable Broadband Internet receiver unit); such that (as further discussed herein) a first portion of the packets of an incoming video is transported and is received over a cellular communication link of the Cellular unit 181, whereas a second portion of the packets of the incoming video is transported (e.g., concurrently, at least partially in parallel) firstly to the Internet Broadband Receiver 182 (e.g., via a wired communication link, or via a satellite-based communication link) and is then transported (e.g., wirelessly, via Wi-Fi or Bluetooth, or even via cable tethering or physical/wired connection) from that Internet Broadband Receiver 182 to the Cellular Device 181; and such that an Assembly Engine 183 at the Cellular-and-Broadband/Multi-Link Communication Arrangement 180 assembles or re-assembles or re-constructs a video-stream from the incoming packets that are received (typically received out-of-order) from the two communication paths.

In accordance with the present invention, the Device 110 need not necessarily compute or determine, again and again, which packet distribution scheme to utilize, and/or at which ratio to distribute the outgoing packets among modems/transceivers/link/routes, and/or which particular modems/transceivers/links/routes to actually utilize for delivery and at which operational parameters or workload for each one of them. Rather, the Device 110 may utilize a local (or remote) Database of Packet Distribution Schemes 139 to store therein representations of packet distribution schemes, such as, schemes that were already computed recently (e.g., 5 seconds or 30 minutes ago) in this same transmission session to this same recipient device, and/or schemes that were already computed historically (e.g., 2 or 5 or 21 days ago) in previous delivery to this same recipient device, and/or schemes that were already computed with regard to delivery to similar type of recipient device (e.g., recipient device of the type "smartphone"; or recipient device of the type "Samsung Galaxy smartphone"; or recipient device of the type "Samsung Galaxy Note 5"; or recipient device of the type "Android tablet with screen resolution of 1200×1920 pixels"; or recipient device of the type "electronic device having a Cellular 4G-LTE transceiver and a Wi-Fi transceiver"; or the like), and/or schemes that were already computed in previous transmission of this same video (or content) to other recipient devise that belong to the same device-type (e.g., as demonstrated above) or that belong to other device-type(s); and/or one or more pre-defined scheme(s) and/or default schemes and/or fallback schemes that may be used (or, that should be used) if a scheme-selection process fails or if an immediate scheme selection is required or if there is insufficient data (or, there is uncertain data or ambiguous data or contradicting data) with regard to current or estimated or predicted performance of modems/transceivers/communication links.

For example, each record or item in the Database of Packet Distribution Schemes 155, may indicate: (a) the characteristic of the packet distribution scheme (e.g., "send video-packets via 4G-LTE Cellular transmitter and via Wi-Fi transmitter at a packet ratio of 2:3"; or, "send video-packets via 4G-LTE cellular transmitter with a limit of 4 Mbps, and via Wi-Fi transmitter without a limit, and at packet ratio of 1:3 between them), and (b) the one or more conditions or criteria (e.g., performance characteristics and/or situational characteristics) that indicate at what situation or scenario this particular scheme should (or may) be selected and deployed (for example, "if the recipient device is an Apple iPhone X"; or "if the recipient device is an Apple iPad equipped with a Cellular transceiver"; of, "if the Cellular Transmitter of the device 110 had an actual transmission bandwidth of at least 3.5 Mbps in the past 30 seconds"; or the like).

In some embodiments, optionally, a Packet Distribution Scheme may further comprise pointers towards particular or discrete packets or packet-sets or sets-of-packets, or blocks of packets, or data-segments or video streamlets, indicating which packet(s) or video-segment(s) are to be transported via a particular communication link or modem or transceiver (e.g., an indication that "packets number 001 through 128 are to be transported via Cellular 4G-LTE link, and in parallel, packets number 129 through 192 are to be transported to the same recipient via Wi-Fi link"); optionally, a copy of the relevant packets or data-segments or streamlets (e.g., an actual copy of the packets or the bytes to be transmitted, and not only pointers towards such stored packets or bytes) may be included in such Packet Distribution Scheme or may be part of the data of a Packet Distribution Scheme.

In some embodiments, the conditions or criteria for selecting or deploying a scheme, may be indicated (e.g., in the Database of Packet Distribution Schemes 155) in absolute values (e.g., "actual transmission bandwidth of at least 3.2 Mbps on the Wi-Fi transmitter"), or in a range-of-values (e.g., "actual transmission bandwidth in the range of 2.6 to 4.4 Mbps on the Cellular 4G-LTE transmitter"), or in relative terms (e.g., "reduce by 20 percent the bandwidth that is currently allocated for transmission via the Cellular 3G transmitter if the actual transmission bandwidth of that Cellular 3G transmitter has decreased by at least 10 percent in the last 45 seconds"), or by using conditional expressions (e.g., "allocate packets for transmission via the Cellular 3G transmitter if and only if the Wi-Fi transmitter indicates an actual bandwidth of less than 1.2 Mbps"), or by using indications to activate/de-activate a particular transmitter/ transceiver/modem, or by using indications to user or to refrain-from-using a particular transceiver/modem/communication link/operator/network, or by using date and/or time and/or geo-location parameters for scheme definition or scheme selection (e.g., "allocate packets to the Wi-Fi transmitter only between 10 PM to 8 AM", or "allocate up to 2.7 Mbps of packets for transmission by the Cellular 4G transmitter only on weekends", or "allocate not more than 0.6 Mbps of packets to the cellular 3G transmitter if it is located in Manhattan"), and/or other suitable indicators and/or conditions.

It is noted that for demonstrative purposes, such schemes may be referred to herein as "packet distribution scheme" or "packet split scheme" or "bonding scheme" or "split scheme" or "bonding scheme" or "multi-link scheme"; and that each such scheme is not limited to only describing the Ratio of allocating or distributing packets for transmission via or across multiple transceivers/modems/communication links, but rather, each such scheme may further enumerate or quantify or indicate other parameters or configurational properties that should be used or that should not be used when such scheme is selected (e.g., which available transceivers/modems/links to utilize or not to utilize, or to activate or not to activate, or to limit or not to limit, or which conditions to apply as demonstrated above, and so forth).

At the device 110, a Scheme Selector 140 may operate to select one of the pre-defined packet distribution schemes; for example, by comparing between: (I) the current or actual or estimated or predicted performance characteristics of one or more (of some, or all) of the available (or the actually-transmitting) modems/transceivers/communication links, and (II) one or more values or ranges-of-values that characterize each Scheme stored in the Database of Packet Distribution Schemes 155. In some embodiments, in addition or instead of performing comparison operations, optionally, a Sufficient Similarity Determination Unit 141 may operate to declare or to determine whether or not there exists sufficient similarity between the sensed or measured performance characteristics; optionally utilizing pre-defined or dynamically-modified margin-of-error parameters or margin-of-similarity parameter (e.g., indicating that a measured value V is considered "sufficiently similar" to a reference value R, if for example, $0.9<V/R<1.1$, indicating a "margin of similarity" of approximately 10 percent upwardly or downwardly relative to the reference value).

Additionally or alternatively, the Device 110 (or another/external/remote unit, on his behalf) may optionally prepare and then utilize and optionally re-utilize multiple versions of the video, or of time/duration-based or other slices or portions or segments of the video (or, of the content intended for transmission), which are encoded at different quality and/or by using different encoding parameters (e.g., bitrate, sampling rate, resolution, codec, encoding scheme, compression scheme, color depth, or the like). For example, a Streamlets/Data-Slices Generator 142 may take the video (or other content) intended for transmission, or may cut or crop a portion or a segment from it (e.g., corresponding to 60 seconds of video playback); and may encode or re-encode or trans-code that slice, one or more times, at one or more (e.g., different) encoding parameters (e.g. in ABR/Adaptive Bit Rate of several encoding outputs and therefore several bandwidths). The multiple versions of the encoded video-segment, and/or the video-packets that correspond to such segment after packetization, are stored in Encoded & Packetized Streamlets/Data-Slices Repository 143; together with meta-data or indicators or descriptors of each encoded/packetized version of the video segment. For demonstrative purposes, a one-minute video segment may be encoded several different times, in order to produce, and to store in said repository, for example: (i) encoded-version-1, of 2,500 kilobytes, encoded with H.264 at bitrate of 1,600 Mbps and at audio sampling rate of 48 KHz, with video resolution of 1080p, packetized into 25 packets of 100 bytes-per-packet; (ii) encoded-version-2, of 2,100 kilobytes, encoded with HEVC/H.265 or AV1 or H.264 at bitrate of 950 Mbps and at audio sampling rate of 44 KHz, with video resolution of 1080p, packetized into 21 packets of 100 bytes-per-packet; (iii) encoded-version-3, of 1700 kilobytes, encoded with H.265 at bitrate of 1500 Mbps and at audio sampling rate of 48 KHz, with video resolution of 720p, packetized into 15 packets of 100 bytes-per-packet; and so forth.

As the Device 110 (or, other delivery entities which may be operated by a common entity or by the same administrator) deliver videos (or other content) to a variety of recipient devices, the Device 110 may gradually collect data with regard to which encoded-version of the video segment is the most suitable, or most adequate, or matching, or would provide better or optimal QoS or QoE, at certain delivery/reception conditions, or which encoded-version of the video segment should "go together" or fits well (from QoS/QoE point-of-view) with a particular Packet Distribution Scheme (e.g., the scheme that defines which modems/transceivers/communication links to utilize, and at which ratio to distribute the packets among them).

For example, based on the QoS/QoE provided by transmission of a particular encoded-version of the video by using a particular Packet Distribution Scheme (or a particular bonding scheme), a Matching Module/Correlator 144 may determine which encoded-version of the video segment should (or may) be used (or, should not be used; or, may not be used) when a particular Packet Distribution Scheme is deployed. For example, the Matching Module/Correlator 144 may determine that "encoded-version-1" of the video segment that is stored in the Encoded & Packetized Streamlets/Data-Slices Repository 143, should be used with "packet-distribution-scheme-4" that is stored in the Database of Packet Distribution Schemes 139, and/or vice versa (namely, that the utilization of that Scheme number 4, should lead to selecting of encoded-version-1 of the video).

Accordingly, once a particular Packet Distribution Scheme is deployed, by way of selecting a particular scheme from the Database of Packet Distribution Schemes 139, or by way of ad hoc/real-time calculation of a new scheme, the Device 110 may utilize an Encoded Version Selector 145 to select, from the Encoded & Packetized Streamlets/Data-Slices Repository 143, a particular encoded-version of the video-segment in order to transmit that particular encoded-version via the one or more relevant transceivers/modems/communication links and in accordance with the distribution ratio and/or other configurational parameters as defined in the particular scheme being deployed.

In some embodiments, optionally, one or more, or some, or all of the modules or units that are discussed above or herein, may be implemented as a single sub-unit or processor, or as a particular or dedicated processing unit or module; for example, as a Multi-Link Bonding Pre-Processor 146, which may perform some or all of the operations discussed herein or above, and which may be located within the Device 110 or externally to it or remotely to it (e.g., at a pre-processing server or remote server or co-located server or cloud computing server).

In some embodiments, the device 110 may use Artificial Intelligence (AI) and/or Machine Learning (ML) and/or deep learning to learn the right, or optimal, or sufficient, or good enough performance splitting for relevant end nodes over several such bonded connections. It will then adapt the creation of new content in pre-processed and pre-split portions according to this learning, discard of splits and schemes that do not match the learnt knowledge and re-do and re-process and re-prepare the splitting for old stored content.

The present invention comprises an apparatus, a method and a system for pre-processing and/or for preparing relevant communication "parcels", or data portions, or data-items, or data chunks, or data "slices", or data segments, that are ready (e.g., in an improved or enhanced format or structure, or having improved or enhanced properties) for transmitting to one or more remote recipients, as well as to their actual and reliable delivery to such remote recipient(s) using (or via, or over) one or more or multiple wireless and/or wired communications links, and particularly but not exclusively by utilizing a multiplicity of wireless communications links that are used simultaneously or near simultaneously or concurrently or during at least partially-overlapping time period(s), and especially for transmission of live video and/or streaming video and/or Video on Demand (VoD) media content.

The Applicants have realized that many mobile devices operating on standard or conventional communication networks, such as cellular networks, Wi-Fi networks, satellite networks or wired lines (such as cables, fiber or xDSL), are limited in the areas or regions or geographical regions in which they have coverage from their network operator and in their download and/or upload rate(s).

The Applicants have also realized that even in areas or regions that the mobile device has good cellular or wireless service, still, a typical or average or effective transmission rate and/or goodput and/or bandwidth and/or throughput, to or from the mobile device in cellular networks and/or Wi-Fi networks, may not be sufficient for adequately and/or reliably transmitting and/or streaming and/or uploading a video stream at a desired quality (e.g., particularly at high quality that is above a pre-defined threshold) in real-time or in close to real time or in near-real-time.

Some embodiments of the present invention may utilize one or more protocols and/or methods and/or systems that use multiple communications links together, more or less at the same time ("simultaneously" or "near simultaneously" or concurrently or during at least partially-overlapping time slots), such that the bandwidth of such multiplicity of communication links is aggregated or bonded or combined, into a total bandwidth that may enable or may allow reliable and/or high-quality transmission of live video and/or of other rich-media content. The data or packets or bits that are intended to be passed or transmitted or relayed from one node to one or more other nodes, is firstly split or divided or allocated between or among a multiplicity of communications or data links or modems or transceivers or connections or sessions. The data may be sent or transmitted in packets, accumulated or not accumulated, optionally utilizing one or more buffers, and/or optionally by using one or more of the methods and/or systems described in U.S. Pat. No. 7,948,933 which is hereby incorporated by reference in its entirety; and/or by using other methods or via standardized protocols, such as Multi-Path-TCP (MPTCP, IETF RFC 6824 or others), or other suitable protocols for that purpose.

Some implementations may utilize transmission of data "slices" in a manner that can change quality of transmission between such slices; for example, by sending a specific data slice reflecting a first quality and then changing to another quality of data slice for a second data slice. Both of such data slices may be prepared in advance or in real time, according to the actual bandwidth or goodput of a single channel. For example, streaming an audio/video clip or segment or transmission to a mobile device over a single communication channel, using slices that are pre-encoded at a specific bitrate (e.g., encoded at 1 Mbps), each data-slice includes a certain number of packets (e.g., 16 packets) or of time (e.g., equivalent to 2 seconds of video); and then changing to a different encoding rate of the next data-slice for the next segment of the video streaming (e.g., pre-encoded at 3 Mbps) because the link and/or connection to the mobile device has improved and now allows or supports this new (e.g., increased) bandwidth, or similarly, preparing and then transmitting an increased bitrate encoded data-slice in view of increased actual bandwidth.

The Applicants have realized that such methods cannot be applied naively or in a straight-forward manner to multi-link communication which utilizes a multiplicity of wireless communication links (or modems, or transceivers) or simultaneously; because each one of the packets, or the data-slices, may be split or divided between or allocated to the multiplicity of such links and/or connections and/or modems and/or transceivers, and a change may occur (e.g., selectively and/or momentarily and/or temporarily) only in some (but not necessarily all) of the operational characteristics of such links or modems or transceivers.

The Applicants have realized that conventional methods lack the ability to adaptively compensate for such changes in only some of the links, for example, with an increase of bitrate or quality of the data-slice that is intended for transmission in or via the other link(s), or alternatively with the ability to adaptively compensate for such changes by changing the load of the other links or modems or transceivers. The Applicants have further realized that the decision(s) how to structure the data-slices so they are more suitable for simultaneous multi-link communication and especially for video streaming over multi-link communication (and especially in a manner that divides or splits a data-slice into portions that are transmitted simultaneously by separate modems or transceivers), as well as the decision(s) how exactly to split the packets that each data-slice is comprised of between the multi-links available at each point in time, as well as the decision which data-slice to use next, are critical parts of the system or the method that delivers cost and complexity savings together with reliable delivery to the end-node and the viewer user experience; while absolutely or relatively optimally such as when also considering resources allocation and consumption, using the multi links available at each point in time and the current actual performance of each such link or modem or transceiver or connection.

The Applicants have realized that the behavior and/or the momentary performance and/or the actual performance of each one of the communication links, or one or more of them, may dynamically change in an unexpected manner due to various reasons or conditions; such changes may occur at very short periods of time (e.g., several microseconds, several milliseconds) or at longer ones (e.g., tens of milliseconds, hundreds of milliseconds, several seconds, and even longer). These changes and fluctuations in behavior and performance of the various communication links (or modems, or transceivers) that are used for transmitting or uploading content or vide, may be described or measured or indicated in terms of, for example, bandwidth, goodput, throughput, error rate, loss rate, latency or delay, jittery behavior, or patterns of each parameter, or other suitable descriptor. Therefore, many times, although not always, the splitting or dividing or distribution of the data (e.g., distributing of the packets to be transmitted) over or across the multiplicity of links or modems or transceivers, may change and may be dynamically adapted to the available total bandwidth and to the bandwidth (and/or other parameters) of each such communication link or IP connection or modem or transceiver.

The Applicants have realized that, for example, at one point in time (or, during a particular time-slot), 40% of a total transmission of 10 Mbps is passed on link #1 (i.e., transmitting 4 Mbps on link #1), and 38% of the total transmission i.e., 3.8 Mbps) is passed on link #2, and 22% of the total transmission (2.2 Mbps) is passed on link #3. This split, or distribution of packets, or division, or multiplexing, may continue for some duration, e.g. for several milliseconds or seconds or minutes or more, as long as the communication links are generally or are more or less stable in their relevant behavior. However, at a subsequent point in time, link #2 might suffer from a performance loss, in one or more of its relevant parameters as described above. The multiplexing or the packet-distribution system may respond, for example, by reducing the total of transmitted packets to fit, or accommodate, or match the new total of relevantly good bandwidth, and/or by changing the split or the distribution or the division of the data (to be transmitted) between or among the relevant links or modems or transceivers. For example, connection or link #1 may now increase its load (if it has that margin to increase its load) and may now carry or transmit 5 Mbps, whereas connection or link #3 may remain on its 2.2 Mbps (for example, because it might not have margin to increase), whereas connection or link #2 may reduce or decrease its load to 1 Mbps, and the transmission generator and/or controller or other suitable transmission management module may reduce the overall transmission rate to the new total rate of the three links, which is in this case comes at 5+2.2+1=8.2 Mbps. All these numbers or rates may fluctuate, and optionally, hysteresis and stabilization algorithms may be applied to them.

The Applicants have realized that, in some cases, transmitting of the same content or the same video content may be performed to multiple end-devices and/or end-users and/or end-user devices and/or recipients, which may have similar or different characteristics; and such transmissions may be performed at the same time, or more or less simultaneously, or at least partially concurrently, or in different times. For example, a user on a smartphone wants to watch a video, and then another 100 users may want to watch the same video (or any part of it), at the same time or later, and at least some of them may use multi-link transmission protocols/communications, at least for part of watching that particular video. The Applicants have realized that in such cases it would be helpful to reduce processing resources (e.g., processors, processing power, processing time, time-to-respond-to-watch request etc.), and therefore to reduce operational cost and/or to increase or improve the user experience.

Further, the Applicants have also realized that the pre-processed packets that are intended for delivery, may be distributed to other processing resources or memory locations other than where initially processed and/or calculated and/or computed; for example, to edge caching, or viewers' peer devices, or remote cache servers in the cloud or on premises of organizations, on proxy servers, etc. This in turn may further reduce operational cost and/or may further increase or improve the user experience. Especially when watching video, or streaming video, and particularly high quality video, using two networks such as cellular with Wi-Fi, or in the home or office, where the cellular may be combined with the home access such as cable, fiber, xDSL or even satellite—which may have a wireless last hop via Wi-Fi or connected via a cable to a device such as a home router or a wireless Access Point (AP) or a or modem to which the cellular modem is also connected, as well as in other scenarios, the user watching experience has value for the advertisers, for the video publishers, and/or for other entities, as well as to the user himself who may directly benefit from improved Quality of Experience (QoE). Additionally or alternatively, reducing or decreasing the processing resources may bring value to the service provider(s) in case of multiple significant number of viewers, over virtually any period of time. Furthermore, bad or low-quality user experience in watching videos, or streaming videos, might include: video and/or audio stream stoppage, video or audio breaks, image or audio freezes, image or audio "jumps", frame loss, buffering (as expressed or indicated by the video player while it awaits more packets as its output buffer is empty), pixilation, visual artifacts and/or audio artifacts, audio degradation, image degradation, reduced video rate (reduced frames per second), reduced resolution, reduced quantization, reduced audio or video quality in general, audio distortions, audio and video becoming out-of-synchronization, reduction in audio quality (e.g., stereo audio becomes mono audio), reduction in frame rate (e.g., a 30 frames-per-second video content is actually being viewed at 15 frames-per-second rate), or the like.

The Applicants have realized that, however, since the actual and/or momentary behavior and/or performance of such communication links and/or network routes and/or transceivers, and especially wireless ones such as cellular and/or Wi-Fi, fluctuate dynamically relatively quickly (or less quickly), then there are a lot of permutations and possible variations with regards to the manner in which a transmission manager operates to split or divide or distribute the video packets between (or among, or across) two or more links (or modems, or transceivers) over time. The longer the video, the more permutations and variations there are during its transmission and/or during its consumption or playback. The more links or network routes or transceivers being used to transmit in parallel the distributed video packets, the more permutations and variations of the split of the video packets between the links are expected to be.

The Applicants have also realized that Virtual Reality (VR) content delivery and/or Augmented Reality (AR) content delivery may require more bandwidth (e.g., relative to a conventional video file), for example, due to higher resolution and/or especially more viewpoints/angles or content in general, and/or may require more synchronicity between different frames and angles in case the video is split or its packets are distributed for transmission in some ways.

In other cases, for example, at least one of the two (or multiple) network connections or IP routes is more stable than others or is even quite stable or is relatively stable, such as many times the case with a home or fixed access connection (cable, fiber, xDSL, satellite, Wi-Fi or similar). In at least some of these cases, the fixed access connection may perform similarly between different homes or offices, i.e., more or less or even quite exactly the same downlink capacity and similar latency for at least one video or media being streamed into the premises, may be experienced by several such premises, being (or not being) at a similar location or vicinity, being (or not being) served by the same headend or similar edge network device. This stability and similarity may in many times continue over time, i.e., may not change from one hour to the next or from one day to the next, at least for some of these access connections at any point in time; for example, when one of the multiple links is a home xDSL modem or a home cable box that receives data from a cable company or from a telephony company over a wired connection.

A demonstrative implementation of the present invention comprises, for example, a processor or controller, or other processing means, as well as data splitting and data delivery system and method to prepare and pre-process such data for multi-link transmission, in a way that allows re-use the pre-processed packets, or streamlets or data-slices or sub-streams or objects or frames or batches or data-segments, thus resulting in lower resource utilization and/or increased user experience. Then, the system performs a selecting process with regard to which data-slices or streamlets or sub-streams or objects or frames or data-segments to transmit, on which of the dynamically changing multi-links and/or the more fixed and stable multi-links connections, as well as at which point in time to change between streamlets or data-slices, in order to deliver reliable and quick transmission of the data stream, is also a process performed by the system and method of this invention.

The system of the present invention overcomes or reduces or eliminates the need to re-calculate the manner in which the data intended for transmission is split or is distributed between or across the multiplicity of communication links or modems or transceivers in real time when the actual links performance is measured, while still ensuring reliable and quick delivery of the data to the end-node or the intended recipient(s). Furthermore, for some of the communication links, i.e., the more stable and known ones, in some cases there is no need to monitor their dynamic performance at all, or the system may monitor the performance of such generally-stable communication link at a lower sampling frequency, since it is quite certain that the needed performance is stably and continuously provided by these connections. This may result in reduced costs for the service provider, for the network operators, potentially for the end user, and/or reduction in the response time and/or the latency to the end user receiving the data, and/or increases the user experience.

When done in real-time, the system and method of the present invention may enable to "process once, deliver many times", or may enable to "process a few discrete times, deliver many times". For example, when streaming live Virtual Reality (VR) content to multiple mobile viewers, using multiple links/networks/modems that are combined or aggregated or bonded simultaneously together, the processing may be done for several "typical" links combinations or transmission conditions, and then the content may be transmitted to multiple viewers, spread globally (multiple geo-locations), including simultaneously to some or all of these mobile or non-mobile devices or recipients, where at least some of these transmissions use multiple links/modems/transceivers/technologies/operators and also including different combinations of those communications links, and the transmission in each link and/or the total over all links towards each such end-device is taken from the pre-processed content, even if not necessarily optimized or optimal for each transmission or end-device, but still being "good enough" or sufficient or adequate to provide the required or the desired Quality of Service (QoS).

A demonstrative benefit of the present invention is, for example, in reducing the processing resources needed or used for such preparing the content for transmissions, with no need to pre-process for each such streamed or downloaded media, where if the conditions of the total bonded transmission over all the communication links (e.g., bonded or combined together) and the specific performance of each communication link are close enough to that of the link and link combination (total bonded transmission) for which pre-processing is or was already done, or at least as good as that, in terms of goodput, throughput, error rate, latency, time-based jittery or fluctuated behavior of each of these parameters, measured or predicted performance of each of these parameters. In such a case of mathematically calculated similarity, the pre-processed split or distribution of packets among links can be used, without necessarily re-calculating an ad-hoc distribution. Even more so when one or more of the links is known to be generally stable and sufficiently continuous in its performance characteristics, such as, for many fixed access connections (e.g., fiber, xDSL, LAN or satellite—when the over-booking and non-guaranteed statistical overbooking of the service are controlled and are stable enough). In some of these cases with a stable enough access connection, it is even not needed to re-calculate again and again the manner of splitting or distributing of packets between the generally-stable link and the other connection or connections, as the fixed access link may be loaded with up to a known bandwidth (also taking into account other usages which may optionally be done on that connection at that point in time).

Further, in some of these cases it may even be unneeded to monitor or to continually monitor the dynamic performance of this generally-stable access network connection, since it is quite and sufficiently stable and known, or it may suffice to monitor and to measure it at a lower monitoring frequency or at a lower sampling frequency, thereby resulting in fewer non-payload bytes being transmitted on it, and/or less resources utilized for the monitoring and calculation, hence lower cost, lower power consumption, lower burden on system resources, or the like.

When the conditions of each of the re-used bonded transmission schemes become significantly different enough, mathematically according to any function of said parameters and thresholds or differential function, from those of the pre-processed one that is actually being used, then another pre-processed split or distribution scheme can be selected and switched to, at the right moment where, for example, an I-frame or B-Frame or P-Frame or another synchronous message or frame control has been made, or even without it due (for example) to "harsh" or strong deviation from the current pre-processed model/transmission function or distribution scheme; or alternatively, a new pre-processing pattern may be generated for this set of new conditions, and it may then be stored and re-used later for other transmissions with sufficiently similar conditions, in absolute terms or relatively when considering pre-processing resources or their cost in terms of availability, power and heat generation, price, other more-advantageous tasks for these resources, revenues based on the transmission, and/or other preferences and parameters.

In some cases, it is possible for the system of the present invention to pre-process and prepare in advance the data streams, or packets, or segments, or data-slices, or data-segments, or accumulated packets, or streamlets that are to be transmitted. By doing so, there is no processing, or very limited processing, that remains to be done later in real time. Further, the prepared streamlets or segments or data-slices can thus be ready for a number of transmissions, and/or can be used and re-used across multiple transmissions at different points-in-time towards different (or the same) recipient or recipients without necessarily re-calculating the optimal distribution of packets and/or without necessarily reconstructing data-slices for such subsequent transmissions of the same content.

The pre-known or pre-estimated performance, or the momentary or actual (e.g., measured, tracked, monitored) performance of each communication link or transceiver or modem during active or actual transmission, as well as the statistics and summary of each communication link and/or modem and/or transceiver performance and the overall or combined performance characteristics, and/or the Quality of Experience (QoE) and Quality of Service (QoS) of the video reception and/or video playback and/or video consumption at the end viewer side or at multiple viewers or multiple recipients, along with these viewers' viewing parameters (such as, which player is utilized for playback, versions, Operating System, resolutions, devices, etc.), may be measured, collected and/or estimated, and may be fed into (and analyzed by) the processor of the system of the present invention, or another performance analytics processor or controller or Integrated Circuit (IC) or module, and such data may be stored locally and/or remotely and/or in a "cloud computing" repository or database or in a "big data" repository or database.

The performance analytics processor may analyze the performance data of the communication links and/or the transceivers and/or the modems that were utilized and/or that are currently utilized and/or that are intended or considered to be utilized for transmission, and may further analyze the end user viewing experience including for example, any buffering, stalls, drops, artifacts, delays, missing or late packets arriving at the viewer bonding or stream re-assembly mechanism and at the viewer player; and may recommend or initiate or command an additional pre-preparing iteration or session or process of bonding segments accordingly. These will also be stored and available to later or subsequent or other viewers or recipients, that may have similar communication links or connections or transceivers or modems or viewing devices or recipient devices (e.g., recipients having the same model of smartphone).

For example, if the analysis or the classification or the extrapolation of performance data in real time and/or after the delivery, shows that a particular viewer suffered buffering, such as more than one time (or, more than K times) during a period of M minutes or for durations longer than T seconds per buffering event (or, as aggregated buffering time), or otherwise based on other conditions or criteria, and this is the result of at least one of the multiple communication links not being able to reliably or adequately carry or transport enough packets (or, being unable to effectively or actually transport data at a rate of at least N Mbps), or sudden increase in the latency or delay, for example on a specific communication link of a particular cellular operator C1, and optionally may further identify or learn or deduce from the performance of the other communication links (such as of those associated with another cellular operator C2) that they can be loaded with or utilized for the transport of more packets at that time in that location, or based on external knowledge or information about the C2 network infrastructure operation (e.g., based on pre-defined information that cellular network C1 is a 4G-LTE network, and pre-defined information that cellular network C2 is a 3G network), then the analytics processor may recommend or initiate or determine or command or compute a different split or division or distribution scheme of the packets to be transmitted in parallel via the multiple communication links (or modems, or transceivers), so that more packets or an increased number of packets (in total, or per second, or per time-unit) will be allocated to be transmitted on or via particular communication links or connections (or modems, or transceivers) that are associated with cellular operator C2. The new packet distribution or split scheme is then stored and added to the list of available pre-processed bonding transmission schemes that are also available to subsequent viewers or to other recipients.

This can be performed in general, with regard to any location or any time-slot; or it may be performed in a specific manner for particular locations and/or times and/or time-slots. For example a Base Transceiver Station (BTS) of cellular operator C2 may be loaded or may have increased burden or reduced availability between 8 AM to 10 AM (e.g., since it is located near a busy intersection of roads that many drivers utilize in the morning on their way to work), but is less burdened and is more available during the rest of the day (e.g., from 10 AM to 3 PM, when no commute traffic or less commute traffic occurs), so that the analytics learning processor may identify or detect or deduce this pattern (e.g., by analyzing data from one or more such time-slots or days); and the relevant split or distribution of bonded transmission to particular communication links (or modems, or transceivers) may be associated with such characterizing data so that only transmissions done or performed at that particular geographic location (or region) and time (or time-slot) would indeed use this specific bonding split or packet distribution scheme, and optionally also utilizing a particular video encoding quality and/or output (e.g., determining to use HD rather than UHD at such times and/or locations).

Devices and systems of the present invention may have multiple uses and/or may provide multiple benefits or advantages, for example, they may aid in real time streaming of live video or other rich media or multimedia content to one or more mobile devices or recipients, such as a cell phone, a smartphone, a tablet, a Virtual Reality (VR) device or headset or headgear or gear or helmet or glasses, an Augmented Reality (AR) device or headset or gear or headgear or helmet or glasses, a wearable device, a portable device, a smart-watch, a gaming device, a gaming console, a video consumption device or system, a vehicular entertainment system or unit, a portable entertainment system or unit, an audio/video playback device, or the like.

In some embodiments, an apparatus is provided for cooperating with a mobile device having an embedded or integrated or built-in transceiver or modem. The term "mobile device" as used herein refers to any suitable device or unit that is configured or able to communicate with a wireless network, including, but not limited to, a smartphone, tablet, mobile station, user equipment (UE), personal digital assistant (PDA), laptop, public safety Land Mobile Radio (LMR) terminals, e-Readers, e-book reading devices, VR devices such as a headset or a mobile projector, AR devices, dedicated terminals, gaming devise, audio/video playback devices, smart-watch devices, wearable devices, portable electronic devices, and/or any other device that enables mobile data communication.

The terms "transceiver" or "modem" as used herein refers to, for example, any device or unit that is capable of or is configured for transmitting and/or receiving signals in or through or via a wireless communication network. For example, a transceiver can communicate with a cellular network, mobile telephony network, Internet Protocol (IP) network, Wi-Fi network, Bluetooth network or pairing, and even with (or using) mesh devices or peer-to-peer devices or ad hoc networks. While the present invention is not limited to any particular transceiver or communications protocol, some embodiments of the invention may employ or may utilize transceiver(s) and/or modem(s) and/or communication link(s) that use one or more of the following exemplary communication standards or protocols: GSM, GPRS, HSPA, Edge, LTE, LTE Advanced, 2G, 3G, 4G, 5G, 4G-LTE, HSPA, CDMA, CDMA Rev A, CDMA Rev B, Wi-Max, IEEE 802.16, Wi-Fi, IEEE 802.11, Bluetooth, ZigBee, COFDM, Wibro, Satellite BGAN, and/or satellite VSAT. Additionally or alternatively, embodiments of the invention may involve or may utilize or may comprise transceivers or modems that use other known or future wireless protocols or standards or communication schemes.

According to some embodiments, a data stream (e.g., a video stream) originating from a cloud (e.g., a "cloud computing" server or repository) or from an on premise server (e.g., within an organization or enterprise) or edge (e.g., of a cellular network) or another server or repository, may be transmitted and/or transported to the mobile device or to a particular end-user device or to a particular recipient by utilizing at least two transceivers (or transmitters) that operate in parallel or generally simultaneously or concurrently; such that, for example, if a data-segment of 600 packets is intended for transmission to that particular recipient, then the data packets are distributed across the two (or more) transceivers, e.g., such that a first transceiver is allocated to transmit data packets 1 through 250, whereas a second transceiver (e.g., having a greater bandwidth or throughput) is allocated to transmit data packets 251 through 600; and each transmitter operates by itself to transmit its allocated packets, and to re-transmit failed packets or missing packets or lost packets or erroneous packets; and the recipient device utilizes a single receiver or two (or more) receivers in conjunction with a Re-Assembly Engine to re-assemble or to re-construct the data-segment or data-stream of those 600 packets from the incoming packets that are received (not necessarily in order) from the two transceivers, optionally using a packet numbering scheme or packet-ID scheme that allows the Re-Assembly Engine to re-construct the data-stream by arranging the received packets in the suitable order. For example, some of the data packets may be streamed or transmitted or transported to the mobile device (or to the end-user device or recipient device) over wireless network such as a first cellular network, using the standard cellular network infrastructure, paths, routes and means; whereas, the other part of the data packets that are intended for delivery, is transmitted or transported via a second wireless network, such as a Wi-Fi network, using the standard network means of such Wi-Fi network or infrastructure. The mobile device (the recipient device) may then reassemble the video stream from the received packets that were received, not necessarily in the original serial order of packets, over the two (or more) communication links, or modems or transceivers, of the same network or technology or of multiplicity of such different networks or technologies.

When measured or monitored conditions or performance characteristics change, at any level—be it the Radio Frequency (RF) level, or the network infrastructure level or parameters, or be it the IP stack level parameters, or be it the application or session level parameters and experience, then the split, or distribution, or division, or allocation, or multiplexing of the data (e.g., the data packets that are intended for transmission) between or among all the multiple connections (modems, transceivers) participating at that point in time, may change or may be modified in order to respond to such changes in conditions or performance. The decision or the determination whether to change, or not, and how or to which degree or in which manner to change (e.g., to allocate more packets to a particular link; to allocate less packets to a particular modem; or the like), may be done by one or more suitable units, for example, located in the mobile device itself and/or by a splitting or packet distribution unit at the transmitting server and/or by any other processor or controller in the middle or by a node or unit or a network element or gateway or proxy or other element that performs monitoring of the service and the connections performance and/or the user experience.

For example, such server may be termed "bonding server". It may differ for each type of session, or application (such as between video from YouTube to video from Facebook to file transfer from the enterprise cloud etc.). It may reside anywhere, as previously described. It may be a single one, a distributed set of servers or units, or multiple units spread globally (e.g., at different geographical zones or regions). It may be co-located and co-working with the pre-processing server or with a multiplicity of such servers, or may be separated from them or remote from them.

The term "pre-processing" may be used interchangeably with "bonding pre-processing", or "multi-link pre-processing", unless otherwise specifically referred to as another type of pre-processing. Sometimes "pre-processing" is interchangeably used as "preparing"—pertaining to the media processing and preparing and/or the monitoring and decision making of which packets to send on at least one of the participating multi-links (such as the stable fixed access connection, for example), and/or further including in the "pre-processing" process the actual decision or determination of which packet distribution scheme to utilize and/or which communication link(s) and/or modem(s) and/or transceivers to utilize and at what ratios of packets distributions among them.

The pre-processing unit or module may be implemented as server, and/or software, and/or processor or controller or Integrated Circuit (IC) running the software or able to execute code or machine-readable instructions. It too may reside anywhere, in the cloud, on edge network devices such as routers, on mobile devices of end-users, on-premises of some organizations, at a server or a server-farm of a transmitting entity or of a Content Delivery Network (CDN), at a transmitting or relaying node or network element, etc. It too may be single, multiple, distributed, replicated, or the like.

The bonding pre-processor prepares multiplicity of data streamlets or packet streamlets or other streamlets that are intended for transmission to one or more remote recipient(s). The streamlets are prepared for example, in discrete steps, not necessarily covering all the continuous and/or dynamic range of all the possible permutations; but rather, corresponding to a list of one or more particular combinations or permutations of possible utilization of multiple communication links and/or modems and/or transceivers. For example, it may pre-process and prepare 3 data-streams or sub-streams or streamlets: the first data-stream intended for transmission at a rate of 10 Mbps; a second data-stream intended for transmission at a rate of 6 Mbps; and a third data-stream intended for transmission at a rate of 2 Mbps. This first stage of the pre-processing may be called preparing multi-bitrate streaming encoding, or preparing multiple versions of different data-streams that are encoded at different bitrates.

Then, it may pre-process and prepare for the first stream a first set of N1 permutations of the split or division of the packets of the video, for all its duration and/or for part of it (e.g., for the first T1 seconds); for the second stream, a second set of N2 permutations of the split or division of packets of the video for a period of T2 of that video; and for the third stream a set of N3 permutations of the split or division of the packets of the video for a period of T3 seconds of that video. The different bandwidth for each pre-prepared stream alternative may be the result of a different encoding of that video feed or source, using relevant parameters for that bandwidth and video source and/or type and/or other characteristics and/or the desired bandwidth output. The bandwidth intended for transmission of each such stream may be the maximal possible bandwidth, an not necessarily the continuous one or the average one; or it may be an average bandwidth, or a bandwidth with relevant statistical parameters.

In some embodiments, the pre-processing results or outputs, such as the split media content per link or pay sub-stream or per performance characteristic, is stored along with metadata describing and identifying (for example) the split function or the packet distribution scheme, the total or combined performance of all of the communication links participating in that split or distribution scheme, the relevant performance of each one of the communication links participating in that split or distribution scheme, timing information, indications of bitrate used and/or encoding used and/or resolution used and/or other meta-data. In addition, a relevant search index or indices may be calculated or computed and/or stored to quantify or identify this information and/or other meta-data or information. The result is, for example, a database or a list or a data-set with relevant calculated data-items representing a matrix of parameters and search indices based on bonded performance of multiple communication links and/or based on the separate performance of each communication link, describing the properties of a bonded transmission scheme in a summarized and/or parameterized and/or indexed and/or quantifiable manner, which then enables matching and/or comparing of a new transmission scenario to previously-computed permutations of bonded communication schemes or to previously-computed permutations of multiple-link packet distribution schemes. In this way, when another transmission is needed, with its own total bonded transmission performance or parameters and/or each of the communication links performance or parameters, then the search for existing one that is "good enough", or mathematically close enough, is made in order to find a matching scheme or a sufficiently-close equivalent from pre-computed packet distribution schemes and/or bonded transmission schemes.

In some embodiments, a "sufficiently close" or a "sufficiently matching" scheme is defined or is found, for example, by checking whether the difference in one or more parameters of a current scenario, and one or more parameters of a pre-computed scheme, is smaller than a pre-defined threshold value; or is lower than K percent of one or more parameter values; or is within a pre-defined range of values that is pre-defined as "sufficiently similar" (e.g., if a parameter value in Scheme A is 15, then the range of 13 to 17 may be pre-defined as a range of "sufficiently similar" or "sufficiently matching" values to declare sufficient similarity of the value of Scheme A to a currently-measured or currently-estimated parameter of a fresh or new scenario). Other methods may be used for determining whether or not a fresh transmission scenario is sufficiently similar to a pre-computed scheme or bonded transmission.

In some embodiments, the transitions from one stable scheme of bonded transmission or packet distribution to another, are also quantified, parameterized, stored and/or indexed. For example, a transition from one particular combination of bonded transmission, such as with a particular type of video quality (resolution, Frames Per Second (FPS), quantifier, encoder output, scenery type, resolution, or the like) with total bandwidth or throughput or goodput of G1 mpbs, and/or other transmission/link parameters (e.g., indicating latency, delay, dropped or lost packets, or the like). Later, when the conditions change to an actual total bandwidth or throughput or good put of G2 Mbps and/or other transmission/link parameters (e.g., indicating latency, delay, dropped or lost packets, or the like), the bonded transmission scheme is selectively switched or changed to a different particular stable bonded split or bonded transmission scheme or bonded transmission packet distribution scheme, and this stable bonded transmission with its typified or current parameters and/or the actual split scheme of the packets are stored and indexed. In this way, when another mathematically close-enough of sufficiently-matching bonded transmission over mathematically close enough (or sufficiently matching) conditions, changes to a mathematically close-enough (or sufficiently matching) conditions of the second bonded transmission (to which the first was stably switched), then the bonding parameters, and/or actual split scheme of packets, may be used for that fresh transmission without the need to perform trials and error till a new stable bonded transmission is found for this content.

In some embodiments pre-processing is done in real time or in near-real-time, or immediately prior to the actual transmission of the video content (or other content) to the end-user device(s); or even in parallel with such transmission, for example, such that while the first 20 seconds of video are being transmitted, the next 10 seconds of the video are prepared or pre-processed for their transmission.

In some embodiments, optionally the system may utilize a "default" or a "fall-over" packet-distribution scheme or bonded transmission scheme, which may be used "blindly" by the system in case that an urgent transmission is required without dedicating any resources or computing power or time for any initial pre-processing; and such "default" scheme may be used for a short period of time (e.g., to transmit the first 1 or 5 or 15 seconds of the video), and in parallel real-time pre-processing may be performed for the subsequent or next portions of the video.

In some embodiments, optionally, the encoding of the video to be transmitted can be done using SVC (Scalable Video Coding) mechanisms, which create a "base" layer at low video quality which requires low bandwidth for transmission (or low bitrate), and then more layers are prepared and/or encoded adding audio/video quality and requiring additional bandwidth for transmission (or higher bitrate). Some implementations may utilize video encoding methods, such as H.264 SVC or HEVC H.265, and/or others, for this purpose. Optionally, a prepared data-slice or streamlet or data-segment can contain both lower bitrate encoded packets and higher bitrate encoded packets (e.g., from the higher layers of the multi-layer encoding scheme). Alternatively, several data-slices may be generated or "packed" or aggregated for the same number of frames, or duration of video, where some data-slices or data-segments contain lower or even the base encoded packets, whereas other data-slice(s) contain higher quality video packets from the higher encoded layers of such multi-layer video encoding scheme.

When transmitting, the lower quality base data-slice may be transmitted using the more rugged connection or link or modem or transceiver (e.g., more reliable, less error rate, less jittery behavior in any or all of the performance parameters, or any other method to describe or predict such reliability or performance) at that point in time; and the other data slice, or data slices, may be transmitted on or via the other link(s) or connection(s) or modem(s) or transceiver(s).

If the additional data-slice(s) is or are of larger volume, or require additional bandwidth, then part of it or part of them may be transmitted over or via the communication link (or modem, or transceiver) that is currently used for the lower, base quality, data slice of that video. At the next moment, due to the potential fluctuations in the performance of each link, the split of each slice between the links (e.g., the particular distribution of packets that are intended for transmission for each such data-slice, among the available links and/or modems and/or transceivers) may change adaptively and/or selectively by the processor, to match the current or actual or estimated performance of each one of the links (or modems, or transceivers) and/or their total current or actual or estimated performance.

In some embodiments, the base-quality video slices may be transmitted on or via the more reliable communication link(s) (or modems, or transceiver(s)) continuously or generally continuously, even when the higher level encoding or the higher quality layer(s) of encoded data for that point (or portion, or segment) in the video stream are still not transmitted, up to a point in time in the video stream where the available bandwidth of the other communication links and of this link is expected to allow timely arrival and/or reliable arrival of sufficient number of higher layer slices or video packets, so that there is no buffering or other issues with the user experience viewing at the receiving end-node or recipient device.

In some embodiments, the base-quality or the base video slices are prepared and stored once. The higher layer, or higher-quality, additional bandwidth consuming data slices are encoded per desired bandwidth, or per desired bitrate, and are also stored. The result is that a single base layer slice may be combined with any of multiplicity of higher layers encoded at different bit rates, with no need to store the same base layer again and again for each one of them.

In some embodiments, the video encoding or other data stream delivery operations is not necessarily done using SVC methods or encoding schemes. For example, it may be done using H.264 or HEVC H.265 or other suitable schemes, with no separate and/or distinct multi-layers exposed to the transport layer (e.g., outside of the encoder-decoder level). In such a case, there is no distinct base layer. However, in accordance with the present invention, even though distinct layers of encoded video are not necessarily used, there may still be (identified, defined) more important (or less important) audio packets or video packets. For example, audio packets may be assigned higher priority in order to maintain audio fluency. Additionally or alternatively, I-Frames of the H.264 encoded video may also be assigned higher priority or higher importance in order to reliably re-build or re-construct the image once there are failures in transmission (e.g., dropped or missing packets). Other types of packets or information may be selectively assigned low priority, or high priority, out of a pre-defined scale or list of several levels of priority. In such cases, there may be applied a similar data-slice structuring mechanism of more important packets (or high priority packets) put together or grouped in the same data-slice and/or decision and splitting mechanism of transmitting the more important packets (or the higher priority packets) or slices on the more reliable connection(s). Optionally, the prioritization of packets or sets-of-packets, the assigning of priority levels to packets or to batches-of-packets, the enforcing of priorities with regard to encoding and/or transmission, and/or other priority-related management operations or decisions, may be performed by the Multi-Link Bonding Pre-Processor 146 or by a dedicated module thereof, such as a Prioritization Assignment and Enforcement Unit 147.

In some embodiments, some or all of the very important or more important or higher priority packets may be pre-prepared for transmission with regard to (or corresponding to) any desired or suitable number of frames or video frames. For example, a video stream may be encoded once in a way that creates an I-Frame for every K frames of video, or for every T milliseconds, and the I-Frames may be stored separately. Then, other or additional or subsequent encoding of the same video stream may be done with more spaced-apart I-Frames (e.g., for every 2K frames of video, or for every 3T milliseconds), and such spaced-apart I-Frames may also be stored separately. Then, during the transmission of that video, if it is reported or estimated or sensed that the recipient may have problems with the video reception and/or the video playback, such as video artifacts, an I-Frame for that video segment and/or video part can be immediately transmitted to that recipient to allow quicker recovery of the video experience, by utilizing the previously-encoded or pre-prepared I-Frame. The subsequent frames may be used from the previously prepared stream of other encoding with the more spaced apart I-Frames.

Alternatively or additionally, at that point in time, or at a later point in time, video encoding resources may be applied or deployed momentarily to create in real time encoded data-slices, or packets, of that and only that particular segment in the video, and are transmitted to that recipient or to those recipients. This way, the pre-processing of the video may be done generically, serving many use cases and various transmission performance situations, and when transmission failures (or delays, or imperfections) occur that cannot be sufficiently recovered using the existing pre-prepared encoded data-slices or packets, then a new data-slice and/or encoding is created on the spot or ad hoc for immediate transmission.

At the video-segment end, or later when the performance of a sufficient number of the communication links is deemed sufficiently stable and matching the characteristics of the exiting pre-prepared encoded segment, the real time encoding may terminate and the pre-processed data-slices, or packets, may be used again for the transmission of subsequent portion(s) of the video stream and for the packet split or packet distribution over the multiplicity of communication links.

The packets, or data-slices, that were thus created in real time for any segment of the video stream in order to address a momentary failure or delay or imperfection, may optionally be stored at the transmitting entity or in a repository associated with it or in another suitable repository, for later or subsequent use; so that when another end-node or recipient encounters a similar need, even if not necessarily while transmitting at exactly the same bandwidth available on each communication link but rather for example, approximately similar (e.g., sufficiently similar, beyond a pre-defined similarity threshold value), then the system determines or decides to use that stored segment rather than generate a new one by encoding in real time with different encoding parameters, and that previously-prepared segment (which may be referred to as a "corrective segment" or a "corrective video segment") is thus selected and re-used and is transmitted over the multiplicity of communication links.

It is noted that the current or fresh split or distribution of packets between or among the multiple communication links (or modems, or transceivers), may be completely or partially different relative to that of the previous split or packet distribution, depending for example on the current actual or estimated performance characteristics of each communication link and of the communication links that were used in the previous streaming attempt (which resulted in an imperfect reception or imperfect playback of the video). Optionally, the communication links themselves may use or may be the same or completely different carrier(s), or operator(s), or communication network(s), or technology or technologies, between the previous transmission session and the current one. Optionally, even the number of the communication links that are utilized, may differ between the previous transmission session or sessions and the current one. For example, in one previous session there may have been 2 communication links used in parallel for bonded transmission, in another previous session there may have been 3 communication links used in parallel for bonded transmission, and in the current session 7 communication links may be used in parallel for the bonded transmission.

All of these transmission sessions may be summed, for example, at more or less (or generally) the same total bit rate, or bandwidth, or any combination of performance parameters (bandwidth, goodput, throughput, error rate, loss rate, latency, delay, jittery behavior, etc.). For example, the 2 links session may have occurred in mid-town Manhattan at rush hour, the 3 links session may have also occurred in midtown Manhattan at a different time of day and/or using other carriers or even the same carrier, whereas and the third transmission session that utilizes the 7 communication links may have occurred in a different region or city or state or country where the available bandwidth or performance of each link or cellular link is much lower, or at a more congested time of the day, or when environmental conditions or weather conditions interfere with transmissions, etc.

In some embodiments, multicasting or broadcasting may be done of (or with, or by using) the pre-processed media elements or sub-streams or packets or data-slices or streamlets, on at least one of the available connections or communication links or modems or transceivers. Optionally, on one or more of the connections, multicasting, or broadcasting, or unicasting for each connection, may be done by using the pre-processed media elements or sub-streams or packets or data-slices or streamlets. For example, a home router may be connected to a cable connection as well as to a cellular modem, and may support bonding or de-bonding, of the two (or more) packets that are sub-streamed and sent to it. In this example, the pre-prepared packets of a media content or a live video or VoD segment, that had previously been identified and processed and prepared for streaming over a fixed (and generally-stable) access connection (whose performance characteristics do not change significantly over time, or, change by no more than N percent upward or downward over time relative to a baseline value), can be streamed in multicast to several recipients such as several fixed access routers or modems or premises or any other ID or recipient, that all have more or less (or generally) the same generally-fixed or generally-unchanging connection(s) performance characteristics between or among them and with the performance level for which the media packets sub-stream had been prepared. The rest of the packets may be then transmitted to each end device or router or recipient, for example, over a cellular connection separately, at the same media quality and service level or at different ones, because each such cellular connection to an end device or recipient may differ in its momentary performance relative to itself (e.g., relative to its own performance T seconds earlier) and/or between or among them (e.g., relative to the current or previous performance of another modem or transceiver). Such multicasting, for example, may save on bandwidth utilization, transmission costs, reception costs, power consumption of network elements servicing the multiple end devices or recipients, other associated costs, or the like, without deterioration or impact on the quality of the video at the end device or the viewing experience.

Data collected from the transmitting and/or receiving devices, or from or about at least one operator's network or specific segments of it, such as a specific BTS or tower or access network element or core network element, or information that is pre-known about the at least one network or connection (e.g., a pre-known information that a particular network is a 4G-LTE network, or is a 3G network), may be stored for example associated with the performance characteristics that are sensed or measured or estimated for each communication link, and/or may be used in deciding which permutation of combinations of links and/or modems and/or transceivers and/or of data-slices to use in accordance with (or based on) their individual and/or aggregate performance characteristics, and/or may be used to switch between or among such permutations or combinations at specific times or time-points or time-slots or geographic locations, for example in accordance with predicted or actual or estimated performance of at least one specific link or connection or modem or transceiver or network.

Quality of Service (QoS) and/or Quality of Experience (QoE) and/or device-related data and/or viewing data and/or video playback data, and/or other performance data or measurements about the actual or estimated or predicted viewing experience, may be collected from the transmitting and/or receiving devices or entities, and/or from the at least one network element or operator or segment of the network, and/or may be computed or estimated based on such collected or monitored data; and may be stored, for example associated with one or more specific split combination scheme(s) or packet distribution scheme(s). The QoS/QoE data may be collected and/or analyzed by the Multi-Link Bonding Pre-Processor 146, or by the Processor 133, or by a dedicated unit or module of the Device 110 (or of system 100) such as a QoS/QoE Data Collector & Analyzer 148.

Such QoS/QoE data and other parameters may also include, for example, quantification of the viewed video quality such as resolution, FPS, missed packets, dropped packets, missing packets, lost packets, erroneous packets, delayed packets, the data about the delayed packets such as the actual delay or latency or jitter of it, the related statistics such as binned or grouped summary of such performance (e.g., across a time period of T seconds, or across N video frames, or the like), the delay of packets in arriving at the receiving-side video player (e.g., specific data, and/or aggregated statistics computed based on the data), measurements or quantified data about receiving-side video-player buffering such as the duration of each buffering event and/or the number of buffering events and/or the frequency of buffering events, data about the viewed video quality such as pixelization or artifacts data, including quantified data such as the duration and/or the size of the at least one artifact, the area of the screen affected by it or by multiple artifacts, as well as data about the viewing player itself, about the device such as screen size or screen resolution or Operating System type and version or codecs installed on the end-user device or codecs supported by the end-user device or other data, the geo-location information or location-based data about the end-user device, the time of commencement and/or termination of video reception and/or video playback, the moving speed and/or acceleration and/or deceleration and/or spatial orientation of the end-user device, the radio or networking parameters of at least one of the communication links or connections such as its Received Signal Strength Indicator (RSSI) or Ec/Io or Tx power or Signal to Noise Ratio (SNR) or other momentary or short-term or long-term or more permanent measurements and/or behavior characteristics and/or performance characteristics.

Such collected, computed and/or estimated data may be used for various purposes by the system of the present invention, for example, to decide or to determine or to select whether to recommend or initiate a new video encoding scheme/output and/or a new packet splitting combination or a new packet distribution scheme across multiple links or modems or transceivers. For example, such data may be collected and analyzed, leading to an automatic or autonomous determination of the system (or the transmitting entity, or the pre-processing unit, or other suitable server or module), to initiate a new video encoding scheme for example at High Definition (HD) quality rather than the previously available Ultra High Definition (UHD) quality, or to initiate a new video encoding scheme at UHD at even a higher bandwidth or bitrate than previously prepared in order to reflect that (or in view of) higher available bandwidth (or goodput, or throughput) rather than a previously-observed or previously-estimated lower available bandwidth on (or via, or though) the multiplicity of communication links (or modems, or transceivers) that are associated with the measured or monitored device QoS and therefore such additional video encoding versions can be prepared and made available to later or subsequent or other viewers with sufficiently similar communication links characteristics or with a sufficiently similar set of links, at that (or in a sufficiently-similar, or nearby, or corresponding) geo-location or time, or at other location or time.

In another example, the collected and/or analyzed data may be used to initiate a new automatic determination to utilize a particular combination of the split packets of the same video encoding that was already done, by which more or increased bandwidth is put on (or is allocated to) link L1 of operator O1, and less or reduced bandwidth is put on (or is allocated to) link L2 of operator O2, either at that location and/or time, or in general or in a range or a group of locations and/or times that are in correlation to (or, that are sufficiently similar to) these that are associated with the measured one(s), and/or to specific devices or video players that are same or sufficiently similar to the one associated with the measured parameters.

In some embodiments, the collected, computed and/or estimated data may be utilized for classification purposes; for example, to classify the current and/or actual and/or measured and/or estimated and/or predicted performance characteristics, of one or more links and/or modems and/or transmitters and/or transceivers and/or data delivery units, into a particular class of performance characteristics of a particular Packet Distribution Scheme, for example into the class of the Packet Distribution Scheme that is the closest or the most similar (e.g., based on sufficient similarity threshold(s), extrapolation, interpolation, or other mathematical function) to the sensed or predicted or estimated data. For example, a performance classifier module or unit may operate to classify the sensed or estimated or predicted performance characteristics, into one of the following three classes or groups that are respective to three different Packet Distribution Schemes: (i) a first performance class of approximately 1.0 to 1.5 Mbps in aggregate that is based on one Wi-Fi link and one Cellular 3G link; or (ii) a second performance class of approximately 2.6 to 3.9 Mbps in aggregate that is based on one Wi-Fi link and one Cellular 4G-LTE link; or (iii) a third performance class of approximately 4.0 Mbps to 12.0 Mbps that is based on at least one xDSL link and at least one Wi-Fi link. In some embodiments, the classification into such a class may be sufficient in order to trigger the selection, and the applying or the deployment or the activation, of the Packet Distribution Scheme that is pre-defined or pre-stored as associated with such class of performance.

In some embodiments, such classification, or selection of other Packet Distribution Scheme(s), may be generated in advance and/or may be applied or deployed for a specific time window or slice or for a particular time-slot or for a particular video-segment or video-version; for example, for a particular two-seconds slice of data, or for a three-minute time-window, or for a particular version of portion of a version of encoded video, or the like. In previous or subsequent time window(s) or slices, different classifications or Schemes may be generated and/or used and/or selected and/or applied. In some time-windows or slices, no classification or Scheme may be or needs to be generated; for example, if no such consistent performance is found suitable or adequate or sufficiently matching. In some embodiments, classifications or Schemes may be further tuned or fine-tuned or modified or otherwise configured or adjusted, or their similarity thresholds or similarity functions may be fine-tuned or modified or configured or adjusted, for example, if the measured (or estimated, or sensed, or monitored, or predicted) performance of one or more of the communication links (or modems, or data transmitters), is more closely or tightly detected or has metrics that are more accurately similar to pre-defined metrics, or alternatively if the performance characteristics are more loosely similar to pre-defined metrics (e.g., measurements results which less resemble the previous pre-stored ones or the pre-stored threshold values or ranges).

In some embodiments, the selection or determination or modification of video encoding scheme or output and/or combination or permutation of multiple communication links (or modems, or transceivers) and the loading or the load in packets on each one, may be deduced from or may be based on at least one viewing device (or at least one recipient device) according to similarity, or anticipated similarity, or the sufficient similarity, between that measured or monitored device and others.

For example, the video viewing experience over a multiplicity of links and the behavior of at least one of these communication links (such as of cellular link or operator L1 in downtown Manhattan at certain date and time), may be used to deduce the expected performance at other locations in the same general area of downtown Manhattan at that date and time (or, within T seconds or M minutes subsequent to that time; and/or, within a distance of up to K meters relative to that geo-locations), or in other geo-locations such as in foreseen similar locations in downtown Chicago, or may be deduced for other times in the same measured location expecting it to be less congested and more available even on that communication link L1, and/or may even deduce the factor or absolute performance values or performance characteristics (e.g., bandwidth, goodput, throughput, delay, latency, error rate, jittery behavior, RSSI, Echo or Tx power, etc.) to which that link is predicted to go or to change in other times.

For example, it may be deduced or estimated or predicted, that while at the measured period of time, buffering events have actually happened N times over T1 period, with buffering occurrence 1 occurring for S1 seconds, then buffering occurrence 2 occurring after an I1 time interval and lasting for S2 seconds, and so on, on the specific combination of bonded or aggregated transmission links, with a particular type or quality of video encoding output and with a particular distribution or split of packets on or across multiple links; and then, it is expected by the system that if more packets, such as P1 more packets, will have been transmitted on other communication links such as L2 and/or L3 associated with the same operator O1 of the link L1 or with at least one different cellular operator O2 or O3, still maintaining the same video encoding quality, then all buffering occurrences are expected to be eliminated, or that buffering events are expected to reduce in their number and/or in their frequency and/or in their length of time. In that case, data about this new splitting or packet distribution permutation or combination across multiple communication links or modems or transceivers, may be stored in the database, associated with the relevant multiple links, operators, location, speed, video performance, date and time, etc. When another viewer at any time connects to the system and wants to watch the same video, the new permutation or video encoding output may be used and the video may be transmitted to him accordingly and also according to the relevant other parameters associated with this viewer.

In other embodiments, a new packet distribution scheme or split may be done in real time or in near-real-time, and the system may automatically and/or autonomously switch from a previously used or previously stored video encoding version to this new permutation or video encoding output in real time or in near-real-time (e.g., within T milliseconds). It may dynamically and autonomously return to the stored video encoding output and splitting or packet distribution scheme according to the changing video quality parameters, the measured performance characteristics (e.g., taking into account networking parameters and/or video application parameters such as the bandwidth or goodput of the transmitted packets over it or the latency etc.).

In other embodiments, the measured or deduced or actual or estimated or predicted video viewing (or playback, or consumption) quality or experience parameters, and/or the performance characteristics of at least one of the communication links or modems or transceivers that used or that are considered as candidates to be used (e.g., including for example the network related parameters in Phy or MAC such as RSSI or Ec/Io etc., and/or application layer parameters such as the goodput or bandwidth or delay or error rate or jittery behavior etc.), may be collected and analyzed and used in order to pre-process and/or pre-prepare other video streams.

For example, if it is identified or detected that a specific video quality or packets splitting combination provides a particular quality of experience, in a specific geo-location and date and time or in general, then the same packet distribution ratio between or among the multiple links or the operators, or the absolute packets split transmission (such as bandwidth or latency on each of the links or each of the operators), may be used or re-used to approximate, predict, estimate and/or create new permutations or combinations for transmission of the same video or of other (e.g., similar or sufficiently similar) video streams.

In this manner, pre-processing or real time processing may be done according to previous measurements in similar conditions. Over time, changes may occur as the analytics processor receives and analyzes new data and measurements that may better reflect changes in the networks or links or operators, or more accurate ones or about more transmissions that can be added to the learning analytics, thereby improving the results of the decision-making process. In some embodiments, optionally, conclusion or assumption or deducing about other streams or other video encoding or other permutations or combinations of multiple communication links, may be extrapolated or estimated or predicted from or base on the measurements or calculated data, and/or may be implemented directly with regard to such other video streams.

In some embodiments, the measurements or the analysis or the classification or the extrapolation may be used for other bonding services, such as data transmission and even bi-directional data transfer. Once the parameters are associated with a certain measured or estimated or predicted QoS or QoE or actual performance of the application layer, even for live or real-time video transmission, then these parameters may be also used to deduce or forecast or predict or estimate bonded transmission of non video data to that device over the multiplicity of communication links or modems or transceivers or operators, using similar ratios between or among links or operators and/or using the actual absolute performance of each of at least one of the links or operators; and by calculating form that information the absolute or relative number or type of packets to be transmitted over each similar link or over a multiplicity of communication links, even if the transmitted data is not necessarily live video and/or is not necessarily video at all (e.g., audio data; file data; rich media data; other types of data). Then, the ratios or absolute value of at least one such communication link can be used to calculate the load in the other direction, from the device uplink or upwardly or upstream to the infrastructure or to the public Internet, using a predefined or learnt or assumed or estimated ratio between the two directions, either in general or for specific cases such as based on the location, technology, date and time, etc.

In some embodiments, the permutations or combinations of splitting or distributing the data-slices, or packets, or encoded video stream over multiplicity of communication links or transceivers or modems, with regard to the pre-prepared permutations and/or any permutation prepared later and even in real time as a response to specific new conditions or performance combination that require such new permutation not yet existing in the stored library of split permutations for this video stream, may be considered and/or may be re-evaluated at each point in time or at pre-defined time intervals (e.g., every T seconds), according to the momentary or current or actual conditions and performance characteristics of each one of the links and/or their total or aggregated performance characteristics.

The system may dynamically perform re-arrangement, modified usage, utilization of a different application, and/or changed utilization of the permutation, even without re-encoding of the entire vide or of portion(s) of the video or content intended for transmission. For example, if a previous video encoding was prepared for utilization with an anticipated rate of 4 Mbps bitrate, and a permutation of splitting or distributing its packets over 4 communication links was prepared, and now there are only 2 communication links available for a specific session or for transmission to a specific end-node or recipient, yet the total bandwidth of the 2 communication links is known or is measured or is estimated or is predicted to be 4.5 Mbps, and the overall behavior and performance of each of the two communication links and their aggregated total is sufficiently stable or generally fixed or generally non-changing and allows transmission at 4 Mbps, then the previous permutation or combination of links and/or the previously-prepared encoded-video version may be used. The runtime/real time processing module may take packets or data-slices pre-prepared to be transmitted over two of the 4 communication links, and transmit them over one of the currently available two communication links, and the other previously prepared packets that were allocated for transmission over or via the other 2 links are transmit over the second link out of the currently available two communication links.

In the above example, selecting which two ones of the previous 4 communication links to utilize and to combine and map into which link of the current two available links, may be done arbitrarily or pseudo-randomly, or may be performed in accordance with the priority and importance of the previously prepared packets or data-slices, the current performance characteristics of each one of the communication links and/or their combined performance characteristics, the performance of each of the previously prepared links, and/or based on a pre-defined priority order or prioritization scheme or pre-defined list (for example, defining that utilizing a fiber-optic link has priority or preference over utilizing an xDSL link, which in turn has priority over utilizing a Wi-Fi link, which in turn has priority over using a cellular 4G-LTE link, which in turn has priority over utilizing a cellular 3G link, or the like).

For example, the split or packet distribution is done in respect, or in proper ratio, to the current performance of each of the two available or chosen communication links, and/or to the cost of transmission of each of the links, and/or other decision criteria. The previously prepared permutation of distribution or split of the data stream or its packets, or the continuous video stream, between or among any number of links or modems or transceivers, can be later modified, in real time or in near real time, automatically and/or autonomously by the system, even without re-encoding the video or portions thereof, to a new or different number of communication links that are available and/or that are useful momentarily or continuously for the whole session or stream duration or for a particular time-period, by combining or further splitting traffic or data or streams or data-slices or packets that were previously prepared for the first number of links connections, to accommodate transmission via the second number of links connections. This may be done arbitrarily, or in correlation to the performance of each of the links, or in correlation to the priority of the packets or slices, in accordance with the above-mentioned prioritization scheme or other priority schemes, or the like.

In other embodiments, if the permutation or combination was done for a smaller number of communication links than those that are currently available, momentarily or for the whole duration of the session of video streaming, then the already existing permutation of how the data-slices or packets are split or distributed between or among the fewer communication links may optionally be used as is, utilizing the same number of communication links as it was prepared for; whereas the other available communication links may be used to increase the reliability of the delivery and/or to enhance the end-node user's experience, for example by transmitting over them partial or whole duplication of any of the data-slices or of the packets within any of the data-slices, and/or by transmitting Forward Error Correction (FEC) signals or messages or packets for them, or for exchanging control messages and/or QoS information. Alternatively, the additional communication links may be intentionally left unused, for example, to conserve power and/or costs, and/or to keep them available for other purposes or to carry other content. Alternatively, the available communication links may be used and combined in a dynamic combination, for example to not continuously load any of the specific links, to reduce costs associated with any of the links, to move from one link to another link that exhibits better performance once such becomes available, to accommodate predicted changes in the QoS/QoE associated with each used link or not-yet-used link, or the like. Alternatively, the previously prepared permutation for the fewer communication links may be split or distributed in real time according to the number of currently available communication links; for example, if it was previously prepared for utilization with 2 communication links, and momentarily or continuously there are 4 available communication links each exhibiting sufficient or good enough performance to carry corresponding parts or packets or data-slices, then the traffic or packets that were previously prepared for transmission over one or more of the previous link(s) can now be split or distributed between or across two or more of the links that are currently available. This dynamic split or re-distribution of packets or data-slices may be done arbitrarily, or pseudo-randomly, or in correlation to the performance of each of the links, or in correlation to the priority of the packets or data-slices, or in accordance with the above-mentioned prioritization scheme or other criteria.

The permutations, and/or multi-bitrate encoded packets or data-slices, can be stored in ways that allow quick and efficient storage and/or search and/or retrieval. For example, some permutations and stored video streams are not stored near areas at which it is less reasonable or less probable that they would be relevant for, according to pre-known data or historical data being gathered and analyzed and/or based on usage patterns of existing or new permutations or predictions. New permutations in a certain area may be stored so that they are retrieved quicker. Permutations metadata and their respective encoded data streams and packets may be stored and retrieved in correlation to the end-node device or recipient device (such as model X, Operating System type Y and version Z, screen size N, etc.), or in correlation to the used communication links (such as, cellular operator O1, cellular technology T1, time of day, geo-location), etc.

Optionally, old, or unused, or least-used, or irrelevant permutations metadata and their packets may be periodically discarded or deleted or purged or archived to save storage space and/or to expedite the decision-making process when selecting from a list of permutations. Alternatively, only the data stream or data-slices or packets may be discarded of or deleted, whereas the permutation metadata itself may be still stored and maintained, as it may require less storage space relative to the video content itself. Such metadata can then be used in case that re-encoding of this video is needed, or any other video or data into more or less same or generally similar bandwidth and using more or less the same or generally similar number of available links and/or characteristics of the performing or used links. Such data can be used as a "recipe", or close-enough or sufficiently-useful optimization, of such future encoding, splitting, packet distribution, and/or transmission, even of data streams or video streams that are different from the original data stream or video stream.

In some embodiments, some of this data or these packets, or sub-streams or streamlets, or all of them, may be stored near or at the edge (e.g., of a cellular network, or of a fiber network, or the like); for example, on a headend or a storage associated with a head-end network device that serves tens or hundreds or thousands of end-homes of premises. In such cases, the delivery time of the specific sub-stream(s) may be even shorter, allowing less or lower buffering in the de-bonding processor (or the re-assembly engine) at the end device or at the recipient access router, and/or may require less packets being transmitted within the core network. Still, when this is only part of the media or the video, a sub-stream that had been pre-prepared and cannot be viewed adequately without the other missing packets or sub-streams that are delivered over the other connection and paths, such as a cellular path, then viewing permission and control may be made possible without further strong security or DRM (Digital Rights Management) keys and authorization at the end device side. Only when the other packets, or sub-streams, are delivered to each of the end devices, even if the other part is multi-casted or broadcasted to all of them, then viewing may be possible at that specific end device.

In some embodiments, the permutations respective data streamlets or data-slices or packets that are prepared can be stored in a distributed way. For example, some data-slices, or streams of data-slices, can be stored at or near the edge of the network, and/or on a cellular operator's cloud computing repository, etc. Other or the same data-slices or streams can be stored elsewhere, on another cellular or Wi-Fi operator's network resources. In this case, the bonding server may instruct in real time which packets or data-slices to stream at each point by each operator, without the need to necessarily deliver all the packets that correspond to that video from once single or central repository, where they were generated and/or stored, to each operator, or to do so again and again as more end-nodes or users want to receive the same data or video stream. This architecture may save network infrastructure resources, may save CDN resources, may reduce error rates, may reduce costs, and may increases efficiency and response time, may increase stability and service reliability, and/or may improve QoS/QoE, while the bonding analysis or the resulting classification or extrapolations may still be done in or at or by a single/central location (or by a few such central nodes), which may be outside and/or independent of each operator's infrastructure, ownership and other resources.

In other embodiments, the video or data streams may be prepared in advance by encoding it, such as in multi-bitrates, but not necessarily by also splitting it to packets-slices or data-slices or time-slices. The decision of how to split or distribute an encoded video-segment to or across multiple connections/links/transmission paths, may be done in real time or in near-real-time, for example taking into account the current or the momentarily-changing performance characteristics of each available link, modem and/or transceiver. Then, the encoded video packets are aggregated into data-slices or long(er) packets; optionally, this aggregation stage may be done earlier, along with the data or video encoding. Then, the packets or the aggregated batches of packets are split or distributed to the multiple available communication links (or modems, or transceivers) at each point in time according to their performance, cost, total performance, etc., and the distribution may be re-evaluated and dynamically modified to accommodate changes in the actual performance of each such link, connection, path, modem and/or transceiver.

In some embodiments, the processor may dynamically and autonomously switch from the pre-recorded stored video encoding output and combination of multiple communication links, to another combination of multiple links and/or to another video encoding output. In some embodiments the new video encoding output and/or the new multi-link permutation or combination, may be prepared or calculated in real time rather than be taken from storage, such as in case the storage is not available, or if the new encoding output or the new multi-link permutation are not already stored, or if the performance of the transmission (based on the data obtained from the storage) to the viewing device is less relevant or is inadequate or does not meet QoS/QoE threshold values. In some embodiments, the processor may dynamically and autonomously switch back from real time processing to re-utilization of a previously stored stream, for example if the measured performance fits or is sufficiently similar to that of a previously-stored stream.

In some embodiments, the pre-processed video packets may be spread or distributed between or among several different locations for storage. They can be distributed in full, i.e., distributing the whole set of packets of a video; or in part, distributing packets of only the portions perceived or estimated or predicted to be transmitted over a specific modem or transceiver or link or network or operator (or, sometimes more than a single modem per network or per operator; or, sometimes more than a single network per operator).

In some embodiments, optionally, advertisements or commercials or banners or promotional content or sponsored content or other content may be added or inserted or injected into the video during the processing and/or storage process, and such added content may also be pre-processed to relevant video encoding quality or multiple qualities or video encoder output or multiple outputs, and/or may be similarly split or distributed to or across multiple permutations or combinations of links or modems or transceivers.

In some embodiments, such advertisement or additional content may be transmitted to the end viewer in advance (e.g., prior to transmission of the actual video content), and/or when there is enough spare bandwidth or sufficient available goodput or throughput over the amount which is needed for the original video transmission. Then, optionally, this additional content may be displayed or played when there are problems or imperfection with the transmitted video and/or with its reception or playback, such as at times of buffering or artifacts, or per instructions embedded in the main video or otherwise transferred to the player or to the bonding software at the receiving side. In some embodiments, optionally, the system may automatically and/or autonomously detect or determine, that a particular end-user device is currently experiencing latency or delays or artifacts or buffering or lower-QoS or lower-QoE or other reception imperfections or other playback imperfection, and may automatically and/or autonomously operate (e.g., via a Promotional Content Injector/Initiator 149) to play-back or to display on that end-user device such added content (e.g., an advertisement or sponsored content) rather than the original video intended for consumption by the viewer, thereby allowing the end-user device to receive and to accumulate and to buffer more video packets that will enable smooth and better-QoS/better-QoE video playback once the added content finishes its playback.

This additional content may optionally be processed or delivered in real time rather than being pre-processed, for example according to each viewer's preferences, or viewer types or end-user device types, of types of display units, and/or momentary video quality or the momentary performance of the transmission over at least one the multiplicity of the links and/or based on decision regarding priorities in utilization of system resources. This video quality or momentary performance may be provided by measurements done by the bonding circuitry, at the receiving side or at the transmitting side or at both sides, and may be shared with local or remote or external algorithms that handle the additional content selection, embedding and transmission.

During its delivery period, the content may be delivered using or by applying a selected pre-processed Scheme, ratio-based or absolute-numbers-based, then may change to be split or divided or distributed over the multiplicity of channels according to real time processing by the bonding circuitry for example if the real time performance characteristics fall outside the threshold value(s) for using the selected Scheme; and then again may use the same or a different selected pre-stored Scheme, for example, if the conditions or the performance of the links or the measured performances or goodput values are again estimated or measured to be within a similarity threshold to that of such selected Scheme for a sufficiently stabilizing duration; and so on, may change or may alternate between pre-processed (pre-stored, previously-stored) Schemes and/or ad-hoc distribution based on real time performance measurements.

Additional content may optionally include Augmented Reality (AR) type of content, such as data or other media, that is to be embedded dynamically or statically over or into other content or other video, e.g., optionally performed via pre-processing which inserts or injects or adds such AR content or AR elements into the video intended to be transmitted.

Such additional content may optionally be split in the transmission process over some of the available and/or the transmitting communication links, according to their performance and/or according to the needs in order to provide adequate QoS/QoE, and optionally, may be displayed or played to the viewer only after it is fully or partially received, resulting in arbitrary or semi arbitrary or not fully pre-defined location of the insertion of the additional content in (or relative to the timeline of) the main content or the main video being consumed. For example, sometimes such additional content may be inserted and played at a first offset or time-point (e.g., at 74 seconds into the video), and sometimes such additional content may be inserted and played only later at a different offset or time-point (e.g., at 135 seconds into the video).

Pre-processing the video stream and pre-splitting it to permutations to be transmitted over the multiplicity of communication links, may allow embedding or joining additional content at several different qualities, durations, or even different additional content-items per each such permutation or combination of video quality and splitting permutation.

Splitting permutations may be typified and mapped to ranges of conditions, and not necessarily for a specific or particular condition (or not necessarily for a specific set of parameters). Range of conditions may include, for example, a range of goodput or bandwidth or throughput over a single communication link or over a multiplicity of communication links combined or over all of the communication links combined; similarly, latency ranges or similarly of error rate ranges may be used, or similarly jittery behavior ranges may be used; and similarly, a range of devices, or a range of devices parameters (such as screen size and quality), may be used by utilizing range-values definitions. In a first example, a first particular packet distribution scheme and/or a particular encoding quality of the video, may be used for transmission to devices of the type "smartphone" that is made by maker "Samsung" and that have a model identifier of "Galaxy" and that are subscribed to "Verizon Wireless" cellular network; whereas, a second particular packet distribution scheme and/or a second particular encoding quality of the video, may be used for all recipient devices that exhibit an average latency of between 0 to 5 milliseconds, and/or that exhibit 3 or less buffering events within 5 minutes, and/or that exhibit more than 3% of dropped or missing or re-transmitted packets. Other suitable criteria may be used to define and to apply such ranges-of-values of these and/or other parameters.

The pre-processing may be done to selected parts or portions of the video rather than to all of it, whereas the rest of the parts of the video may be processed in real time or in near real time. Then, the transmission of the full video may take the pre-processed parts and transmit them, and may use their parameters (such as video encoding output or quality and/or the ratio or absolute values or packet numbers or data-slice sizes that are transmitted over at least one of the participating links) to encode and transmit the non pre-processed parts in real time or in near-real-time, or use a different set of parameters for each portion of the video for the purpose of its encoding and/or transmission.

If the received video quality changes between video portions, such as due to changes in the resolution, then the bonding module or re-assembly engine at the receiving side or the video player may be configured to change its output in real time (or in near real time) without exhibiting artifacts or black screens or breakage, according to one or more parameters associated with the relevant frames in the video.

In some embodiments, optionally, pricing or costs of transmission and/or reception and/or data storage and/or processing operations, may also be taken into account as part of the decision which permutation or combination of communication links, and/or which packet distribution scheme among such links, and/or which video encoding quality, to use in each transmission or with regard to transport of the video to a particular user or to a particular group of recipients (e.g., "smartphones" as a group of devices; "laptops connected to xDSL modem" as a group of devices; "devices having a screen resolution of 1300×900 pixels or less" as a group of devices; and so forth). For example, higher resolution or more communication links may be used for transmitting the content to up to X viewers, simultaneously or in an aggregated manner, and from the X+1 user and onward a lower resolution or fewer communication links or less expensive communication links may be used in order to reduce overall cost to the operator of the service and/or in order to meet pricing constraints or budget constraints, or in order to encourage "early adopters" or the first viewers of the content with this higher quality incentive, or for other reasons or to achieve other goals. Another cost related scheme may be, for example, to transmit to at least one user at a higher bitrate and/or quality of encoding or by using a particular permutation or combination of communication links, up to a particular consumption measure or consumption mile-stone, and then to lower (or modify) the encoding quality and/or the links combination and/or the packet distribution scheme; for example, to transmit to a particular user the first 5 minutes of a video, at UHD resolution, over a combination of 4G-LTE cellular communication link and a fixed-access xDSL wired communication link; and then, after the first 5 minutes of video are transported and/or consumed, to modify the video encoding quality (e.g., from UHD to HD, or from 1080p to 720p) and/or to modify the links combination (e.g., from 4G-LTE and xDSL, to only xDSL), and/or to modify the packet distribution scheme among the participating communication links or communication paths (e.g., to change from a first packet allocation ratio of 1:3 over the 4G-LTE link and the xDSL link, to a second packet distribution ratio of 1:5 over the 4G-LTE link and the xDSL link). Other suitable modifications may be performed, to comply with pricing or costs constraints, to provide various incentives to end-users, to implement a promotion or a premium service or a discounted service, and/or to achieve other goals.

Some portions of the discussion may relate, for demonstrative purposes, to Device 110 as performing "transmitting" operations or as being a "transmitting" device; however, Device 110 may not necessarily be implemented as a transmitting device, but rather, may be implemented as other suitable type of device, for example, content delivery device, content distribution device, content transport device, content relay device, content provider device, or the like.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Some embodiments include a method for delivering packets of a content from a delivery device to a recipient device having a recipient Internet Protocol (IP) address, the method comprising: inequitably distributing packets of said content, for delivery across two or more data transmitters that transmit data to said recipient device over two or more respective, different, communication links; wherein said distributing of said packets is performed by selecting and applying a particular Packet Distribution Scheme out of a plurality of different pre-stored Packet Distribution Schemes.

In some embodiments, selecting and applying said particular Packet Distribution Scheme comprises: selecting and applying said particular Packet Distribution Scheme which indicates at which ratio to distribute packets of said content, that are intended to be delivered from said delivery device to said recipient device, across said two or more data transmitters.

In some embodiments, selecting and applying said particular Packet Distribution Scheme comprise: selecting and applying said particular Packet Distribution Scheme which indicates (i) that a first set of packets of said video content are to be delivered to said recipient device via a first particular one-to-one communication link, and (ii) that a second, different, set of packets of said video content are to be delivered to said recipient device via a second particular one-to-one communication link.

In some embodiments, selecting and applying said particular Packet Distribution Scheme comprise: selecting and applying said particular Packet Distribution Scheme which indicates (i) that a first set of packets of said video content are to be delivered to said recipient device at a first time-window via a first particular one-to-one communication link, and (ii) that a second, different, set of packets of said video content are to be delivered to said recipient device at a second time-window via a second particular one-to-one communication link.

In some embodiments, selecting and applying said particular Packet Distribution Scheme comprise: switching from (i) applying said particular Packet Distribution Scheme that was selected from a plurality of pre-stored Packet Distribution Schemes, to (ii) applying an ad-hoc Packet Distribution Scheme that is dynamically determined, based on actual momentary performance characteristics of the two or more communication links.

In some embodiments, selecting and applying said particular Packet Distribution Scheme comprise: switching from (i) applying said particular Packet Distribution Scheme that was selected from a plurality of pre-stored Packet Distribution Schemes, to (ii) applying an ad-hoc Packet Distribution Scheme that is dynamically determined, based on predicted momentary performance characteristics of the two or more communication links.

In some embodiments, selecting and applying said particular Packet Distribution Scheme comprise: at one or more time-points, determining actual momentary performance characteristics of at least one of said two or more data transmitters; and selecting from said plurality of different pre-stored Packet Distribution Schemes a particular Packet Distribution Scheme which is sufficiently similar to said actual momentary performance characteristics.

In some embodiments, selecting and applying said particular Packet Distribution Scheme comprise: at one or more time-points, estimating predicted momentary performance characteristics of at least one of said two or more data transmitters; and selecting from said plurality of different pre-stored Packet Distribution Schemes a particular Packet Distribution Scheme which is sufficiently similar to said predicted momentary performance characteristics.

In some embodiments, selecting and applying said particular Packet Distribution Scheme comprises: determining that a first data transmitter and a second data transmitter are currently available for transmission of data to said recipient; and determining that a third data transmitter is currently not sufficiently available for transmission of data to said recipient; selecting from said plurality of different pre-stored Packet Distribution Schemes a particular Packet Distribution Scheme which indicates distribution of packets only across said first data transmitter and said second data transmitter and not across said third data transmitter.

In some embodiments, selecting and applying said particular Packet Distribution Scheme comprise: determining that a first data transmitter and a second data transmitter are currently providing a Quality of Service (QoS) which is equal to or greater than a QoS threshold value; and determining that a third data transmitter is currently providing a QoS which is smaller than said QoS threshold value; selecting from said plurality of different pre-stored Packet Distribution Schemes a particular Packet Distribution Scheme which indicates distribution of packets only across said first data transmitter and said second data transmitter and not across said third data transmitter.

In some embodiments, the method comprises: prior to transmission of said video content to said recipient device, performing a pre-processing stage in which said video content is encoded into two or more encoded-video versions, by utilizing two or more, respective, encoding parameters; wherein said pre-processing stage further comprises: creating a record that indicates that a first encoded-video version is to be utilized with a first particular Packet Distribution Scheme, and that further indicates that a second encoded-video version is to be utilized with a second particular Packet Distribution Scheme.

In some embodiments, selecting and applying said particular Packet Distribution Scheme comprise: (a) determining that a particular content item is to be delivered to a first recipient device via said particular Packet Distribution Scheme; (b) determining that said particular content item is required to be delivered to a second recipient device; (c) determining to deliver said particular content item to said second recipient device by using the same particular Packet Distribution Scheme that was used in step (a) for delivering said particular content item to said first recipient device.

In some embodiments, selecting and applying said particular Packet Distribution Scheme comprise: (a) determining that a first content item is to be delivered to a first recipient device via said particular Packet Distribution Scheme; (b) determining that a second content item is required to be delivered to said first recipient device; (c) determining to deliver said second content item to said first recipient device by using the same particular Packet Distribution Scheme that was used in step (a) for delivering said first content item to said first recipient device.

In some embodiments, selecting and applying said particular Packet Distribution Scheme comprise: (a) determining that a second content item is required to be delivered to a second recipient device which has momentary performance characteristics that are sufficiently similar to momentary performance characteristics of a first recipient device; (b) determining to deliver said second content item to said second recipient device by using the same particular Packet Distribution Scheme that was used for delivering said first content item to said first recipient device.

In some embodiments, selecting and applying said particular Packet Distribution Scheme comprise: applying said particular Packet Distribution Scheme which defines, in absolute terms, quantity of data to be transmitted per time-interval via each data-transport channel to the recipient device. In some embodiments, selecting and applying said particular Packet Distribution Scheme comprise: applying said particular Packet Distribution Scheme which defines a ratio of quantities of packets that are to be delivered per time-interval via at least one of the data-delivery connections to the recipient device.

In some embodiments, selecting and applying said particular Packet Distribution Scheme comprise: (a) selecting a first set of communication links for transmitting a first content item to a first recipient device; (b) selecting a second, different, set of communication links for transmitting the first content item also to a second recipient device, based on an estimation that the first and second recipient devices have sufficiently similar performance characteristics.

In some embodiments, wherein selecting and applying said particular Packet Distribution Scheme comprise: (a) selecting a first set of communication links for transmitting a first content item to a first recipient device; (b) subsequently, selecting a second, at least partially different, set of communication links for transmitting the first content item also to a second recipient device, based on an estimation that the first and second recipient devices are associated with network conditions that have sufficiently similar performance characteristics.

In some embodiments, selecting and applying said particular Packet Distribution Scheme comprise: (a) selecting a first set of communication links for transmitting a first content item to a first recipient device; (b) subsequently, selecting a second, at least partially different, set of communication links for transmitting the first content item also to a second recipient device, based on an estimation that the first and second recipient devices are associated with network conditions that have sufficiently similar Quality of Service (QoS) or Quality of Experience (QoE) characteristics.

In some embodiments, selecting and applying said particular Packet Distribution Scheme comprise: applying a new Packet Distribution Scheme, which approximates a pre-stored Packet Distribution Scheme and which is not identical to said pre-stored Packet Distribution Scheme, based on a sufficient similarity determined between (i) performance characteristics of a current transmission and (ii) performance characteristics of a previous transmission that utilized said pre-stored Packet Distribution Scheme.

In some embodiments, selecting and applying said particular Packet Distribution Scheme comprise: selecting and applying said particular Packet Distribution Scheme that indicates to deliver to said recipient device (i) some packets of the content via a cellular communication link and (ii) some other packets of the content via a fixed non-cellular communication link.

In some embodiments, selecting and applying said particular Packet Distribution Scheme comprise: selecting and applying said particular Packet Distribution Scheme that indicates to deliver to said recipient device (i) some packets of the content via a cellular communication link and (ii) some other packets of the content via a Wi-Fi communication link.

In some embodiments, selecting and applying said particular Packet Distribution Scheme comprise: selecting and applying said particular Packet Distribution Scheme that indicates to transmit to said recipient device (i) some packets of the content via a cellular communication link and (ii) some other packets of the content via one of DSL or Fiber or Satellite communication link.

In some embodiments, said selecting and applying of said particular Packet Distribution Scheme are performed at a content delivery element of a Content Deliver Network (CDN). In some embodiments, defining multiple Packet Distribution Schemes is performed at a content delivery element of a Content Deliver Network (CDN).

In some embodiments, defining multiple Packet Distribution Schemes is performed at a content delivery element of a single Communications Service Provider which operates at least two different networks of two different communication types. In some embodiments, inequitably distributing the packets comprises: inequitably distributing the packets of said content, for delivery across two or more data transmitters that transmit data to said recipient device over two or more respective, different, one-to-one communication links.

In some embodiments, a process comprises: generating and storing at least one Packet Distribution Scheme, that indicates a manner of inequitable distribution of packets that are intended for delivery to a single recipient device, across two or more transmitting units.

In some embodiments, generating the at least one Packet Distribution Scheme is based on analysis of current momentary performance characteristics of at least one of said two or more transmitting units. In some embodiments, the generating the at least one Packet Distribution Scheme is based on analysis of historic performance characteristics of at least one of said two or more transmitting units. In some embodiments, generating the at least one Packet Distribution Scheme is based on analysis of predicted momentary performance characteristics of at least one of said two or more transmitting units.

In some embodiments, generating the at least one Packet Distribution Scheme comprises: generating a Packet Distribution Scheme that indicates a ratio between (I) size of packets allocated for delivery through a first transmitting unit during a particular time-window, and (II) size of packets allocated for delivery through a second transmitting unit during said particular time-window.

In some embodiments, generating the at least one Packet Distribution Scheme comprises: generating a Packet Distribution Scheme that indicates (I) a first absolute size of packets that are allocated for delivery through a first transmitting unit during a particular time-window, and (II) a second absolute size of packets that are allocated for delivery through a second transmitting unit during said particular time-window.

In some embodiments, generating the at least one Packet Distribution Scheme is based on analysis of effective throughput characteristics of at least one of said two or more transmitting units during a particular time-window. In some embodiments, generating the at least one Packet Distribution Scheme is based on analysis of actual latency characteristics of at least one of said two or more transmitting units during a particular time-window. In some embodiments, generating the at least one Packet Distribution Scheme is based on analysis of jittery behavior characteristics of at least one of said two or more transmitting units during a particular time-window. In some embodiments, generating the at least one Packet Distribution Scheme is based on classification of performance characteristics of at least one of said two or more communication links during a particular time-window.

In some embodiments, generating the at least one Packet Distribution Scheme is based on analysis of effective throughput characteristics of at least one of said two or more transmitting units during delivery of a particular video-portion. In some embodiments, generating the at least one Packet Distribution Scheme is based on analysis of actual latency characteristics of at least one of said two or more transmitting units during delivery of a particular video-portion. In some embodiments, generating the at least one Packet Distribution Scheme is based on analysis of jittery behavior characteristics of at least one of said two or more transmitting units during delivery of a particular video-portion. In some embodiments, generating the at least one Packet Distribution Scheme is based on classification of performance characteristics of at least one of said two or more communication links during delivery of a particular video-portion.

Some embodiments include an apparatus or device or system for transporting a video content from a delivery device to a recipient device having a recipient Internet Protocol (IP) address; for example, such apparatus comprising: a packet distribution unit to inequitably distribute packets of said video content, for transmission across two or more transmitters that transmit data to said recipient device over two, different, one-to-one communication links, based on a Packet Distribution Scheme that is selected out of a plurality of different pre-stored Packet Distribution Schemes; wherein said particular Packet Distribution Scheme indicates at least one of: (I) at which ratio to distribute packets, that are intended to be transmitted from said delivery device to said recipient device, across said two or more transmitters; (II) which particular packets of said video content are to be transmitted to said recipient device via a first communication link, and which other particular packets of said video content are to be transmitted to said recipient device via a second communication link.

Some embodiments include a device or apparatus or system for delivering packets of a content from a delivery device to a recipient device having a recipient Internet Protocol (IP) address; for example, such system comprising: a processor (or controller, or Integrated Circuit (IC), or processing core, or logic unit, or one or more software units and/or hardware units) to inequitably distribute packets of said content, for delivery across two or more data transmitters that transmit data to said recipient device over two or more respective, different, communication links; wherein said processor is to distribute said packets by selecting and applying a particular Packet Distribution Scheme out of a plurality of different pre-stored Packet Distribution Schemes.

In some embodiments, said processor selects and applies said particular Packet Distribution Scheme which indicates at which ratio to distribute packets of said content, that are intended to be delivered from said delivery device to said recipient device, across said two or more data transmitters.

In some embodiments, said processor selects and applies said particular Packet Distribution Scheme which indicates (i) that a first set of packets of said video content are to be delivered to said recipient device via a first particular one-to-one communication link, and (ii) that a second, different, set of packets of said video content are to be delivered to said recipient device via a second particular one-to-one communication link.

In some embodiments, said processor selects and applies said particular Packet Distribution Scheme which indicates (i) that a first set of packets of said video content are to be delivered to said recipient device at a first time-window via a first particular one-to-one communication link, and (ii) that a second, different, set of packets of said video content are to be delivered to said recipient device at a second time-window via a second particular one-to-one communication link.

In some embodiments, said processor switches from (i) applying said particular Packet Distribution Scheme that was selected from a plurality of pre-stored Packet Distribution Schemes, to (ii) applying an ad-hoc Packet Distribution Scheme that is dynamically determined, based on actual momentary performance characteristics of the two or more communication links. In some embodiments, said processor switches from (i) applying said particular Packet Distribution Scheme that was selected from a plurality of pre-stored Packet Distribution Schemes, to (ii) applying an ad-hoc Packet Distribution Scheme that is dynamically determined, based on predicted momentary performance characteristics of the two or more communication links.

In some embodiments, said processor, at one or more time-points, determines actual momentary performance characteristics of at least one of said two or more data transmitters; and selects from said plurality of different pre-stored Packet Distribution Schemes a particular Packet Distribution Scheme which is sufficiently similar to said actual momentary performance characteristics. In some embodiments, said processor, at one or more time-points, estimates predicted momentary performance characteristics of at least one of said two or more data transmitters; and selects from said plurality of different pre-stored Packet Distribution Schemes a particular Packet Distribution Scheme which is sufficiently similar to said predicted momentary performance characteristics.

In some embodiments, said processor: determines that a first data transmitter and a second data transmitter are currently available for transmission of data to said recipient; and determines that a third data transmitter is currently not sufficiently available for transmission of data to said recipient; selects from said plurality of different pre-stored Packet Distribution Schemes a particular Packet Distribution Scheme which indicates distribution of packets only across said first data transmitter and said second data transmitter and not across said third data transmitter.

In some embodiments, said processor: determines that a first data transmitter and a second data transmitter are currently providing a Quality of Service (QoS) which is equal to or greater than a QoS threshold value; and determines that a third data transmitter is currently providing a QoS which is smaller than said QoS threshold value; selects from said plurality of different pre-stored Packet Distribution Schemes a particular Packet Distribution Scheme which indicates distribution of packets only across said first data transmitter and said second data transmitter and not across said third data transmitter.

In some embodiments, said processor, prior to transmission of said video content to said recipient device, performs a pre-processing stage in which said video content is encoded into two or more encoded-video versions, by utilizing two or more, respective, encoding parameters; wherein said pre-processing stage further comprises creation of a record that indicates that a first encoded-video version is to be utilized with a first particular Packet Distribution Scheme, and that further indicates that a second encoded-video version is to be utilized with a second particular Packet Distribution Scheme.

In some embodiments, said processor: (a) determines that a particular content item is to be delivered to a first recipient device via said particular Packet Distribution Scheme; (b) determines that said particular content item is required to be delivered to a second recipient device; (c) determines to deliver said particular content item to said second recipient device by using the same particular Packet Distribution Scheme that was used in step (a) for delivering said particular content item to said first recipient device.

In some embodiments, said processor (a) determines that a first content item is to be delivered to a first recipient device via said particular Packet Distribution Scheme; (b) determines that a second content item is required to be delivered to said first recipient device; (c) determines to deliver said second content item to said first recipient device by using the same particular Packet Distribution Scheme that was used in step (a) for delivering said first content item to said first recipient device.

In some embodiments, said processor: (a) determines that a second content item is required to be delivered to a second recipient device which has momentary performance characteristics that are sufficiently similar to momentary performance characteristics of a first recipient device; (b) determines to deliver said second content item to said second recipient device by using the same particular Packet Distribution Scheme that was used for delivering said first content item to said first recipient device.

In some embodiments, said processor applies said particular Packet Distribution Scheme which defines, in absolute terms, quantity of data to be transmitted per time-interval via each data-transport channel to the recipient device.

In some embodiments, said processor applies said particular Packet Distribution Scheme which defines a ratio of quantities of packets that are to be delivered per time-interval via at least one of the data-delivery connections to the recipient device.

In some embodiments, said processor: (a) selects a first set of communication links for transmitting a first content item to a first recipient device; (b) selects a second, different, set of communication links for transmitting the first content item also to a second recipient device, based on an estimation that the first and second recipient devices have sufficiently similar performance characteristics.

In some embodiments, said processor: (a) selects a first set of communication links for transmitting a first content item to a first recipient device; (b) subsequently, selects a second, at least partially different, set of communication links for transmitting the first content item also to a second recipient device, based on an estimation that the first and second recipient devices are associated with network conditions that have sufficiently similar performance characteristics.

In some embodiments, said processor: (a) selects a first set of communication links for transmitting a first content item to a first recipient device; (b) subsequently, selects a second, at least partially different, set of communication links for transmitting the first content item also to a second recipient device, based on an estimation that the first and second recipient devices are associated with network conditions that have sufficiently similar Quality of Service (QoS) or Quality of Experience (QoE) characteristics.

In some embodiments, said processor applies a new Packet Distribution Scheme, which approximates a pre-stored Packet Distribution Scheme and which is not identical to said pre-stored Packet Distribution Scheme, based on a sufficient similarity determined between (i) performance characteristics of a current transmission and (ii) performance characteristics of a previous transmission that utilized said pre-stored Packet Distribution Scheme.

In some embodiments, said processor selects and applies said particular Packet Distribution Scheme that indicates to deliver to said recipient device (i) some packets of the content via a cellular communication link and (ii) some other packets of the content via a fixed non-cellular communication link.

In some embodiments, said processor selects and applies said particular Packet Distribution Scheme that indicates to deliver to said recipient device (i) some packets of the content via a cellular communication link and (ii) some other packets of the content via a Wi-Fi communication link.

In some embodiments, said processor selects and applies said particular Packet Distribution Scheme that indicates to transmit to said recipient device (i) some packets of the content via a cellular communication link and (ii) some other packets of the content via one of DSL or Fiber or Satellite communication link.

In some embodiments, said processor selects and applies said particular Packet Distribution Scheme at a content delivery element of a Content Deliver Network (CDN).

In some embodiments, said processor defines multiple Packet Distribution Schemes at a content delivery element of a Content Deliver Network (CDN).

In some embodiments, said processor defines multiple Packet Distribution Schemes at a content delivery element of a single Communications Service Provider which operates at least two different networks of two different communication types.

In some embodiments, said processor inequitably distributes the packets of said content, for delivery across two or more data transmitters that transmit data to said recipient device over two or more respective, different, one-to-one communication links.

In some embodiments, an apparatus or device or system comprises: a processor to generate and to store in a memory unit at least one Packet Distribution Scheme, that indicates a manner of inequitable distribution of packets that are intended for delivery to a single recipient device, across two or more transmitting units.

In some embodiments, said processor generates the at least one Packet Distribution Scheme based on analysis of current momentary performance characteristics of at least one of said two or more transmitting units. In some embodiments, said processor generates the at least one Packet Distribution Scheme based on analysis of historic performance characteristics of at least one of said two or more transmitting units. In some embodiments, said processor generates the at least one Packet Distribution Scheme based on analysis of predicted momentary performance characteristics of at least one of said two or more transmitting units.

In some embodiments, said processor generates a Packet Distribution Scheme that indicates a ratio between (I) size of packets allocated for delivery through a first transmitting unit during a particular time-window, and (II) size of packets allocated for delivery through a second transmitting unit during said particular time-window.

In some embodiments, said processor generates a Packet Distribution Scheme that indicates (I) a first absolute size of packets that are allocated for delivery through a first transmitting unit during a particular time-window, and (II) a second absolute size of packets that are allocated for delivery through a second transmitting unit during said particular time-window.

In some embodiments, said processor generates the at least one Packet Distribution Scheme based on analysis of effective throughput characteristics of at least one of said two or more transmitting units during a particular time-window. In some embodiments, said processor generates the at least one Packet Distribution Scheme based on analysis of actual latency characteristics of at least one of said two or more transmitting units during a particular time-window. In some embodiments, said processor generates the at least one Packet Distribution Scheme based on analysis of jittery behavior characteristics of at least one of said two or more transmitting units during a particular time-window. In some embodiments, said processor generates the at least one Packet Distribution Scheme based on classification of performance characteristics of at least one of said two or more communication links during a particular time-window.

In some embodiments, said processor generates the at least one Packet Distribution Scheme based on analysis of effective throughput characteristics of at least one of said two or more transmitting units during delivery of a particular video-portion. In some embodiments, said processor generates the at least one Packet Distribution Scheme based on analysis of actual latency characteristics of at least one of said two or more transmitting units during delivery of a particular video-portion. In some embodiments, said processor generates the at least one Packet Distribution Scheme based on analysis of jittery behavior characteristics of at least one of said two or more transmitting units during delivery of a particular video-portion. In some embodiments, said processor generates the at least one Packet Distribution Scheme based on classification of performance characteristics of at least one of said two or more communication links during delivery of a particular video-portion.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
   delivering packets of a content item from a delivery device to a recipient device having a recipient Internet Protocol (IP) address, by performing:
   inequitably distributing said packets of said content item, for delivery from said delivery device to said recipient device via two or more different Internet Protocol (IP) network communication links,
   wherein said distributing of said packets is performed by selecting and applying a particular multi-link Packet Distribution Scheme out of at least two different pre-stored multi-link Packet Distribution Schemes:
   wherein said selecting and said applying comprise:
   (a) determining that a first content item is required to be delivered from said delivery device to said recipient device which is a first recipient device, utilizing said particular multi-link Packet Distribution Scheme which comprises at least a first IP communication link and a second IP communication link;
   (b) determining that a second content item, which is identical to the first content item or is different from the first content item, is required to be delivered from said delivery device to a second recipient device, utilizing another multi-link Packet Distribution Scheme which comprise at least a third IP communication link and a fourth IP communication link;
   (c) determining that performance characteristics of the third IP communication link and the fourth IP communication link are sufficiently similar to performance characteristics of the first IP communication link and the second IP communication; link;
   (d) based on the determining of step (c), further determining to deliver said second content item to said second recipient device by using the same particular multi-link Packet Distribution Scheme that was used for delivering said first content item to said first recipient device when using said first IP communication link and said second IP communication link.

2. The method of claim 1,
wherein said selecting and said applying comprise:
selecting and applying said particular multi-link Packet Distribution Scheme which indicates at which approximate ratio between s-aid two or more data connections to perform the distributing of said packets that are intended to be delivered from said delivery device to said recipient device, across said two or more data connections.

3. The method of claim 1,
wherein said selecting and said applying comprise:
selecting and applying said particular multi-link Packet Distribution Scheme which indicates (i) that a first set of said packets of said content item are to be delivered to said recipient device via a first particular communication link, and (ii) that a second set of said packets of said content item are to be delivered to said recipient device via a second particular communication link.

4. The method of claim 1,
wherein said selecting and said applying comprise:
switching between (i) applying said particular multi-link Packet Distribution Scheme that was selected from a plurality of pre-stored multi-link Packet Distribution Schemes, and (ii) applying an ad-hoc multi-link Packet Distribution Scheme that is dynamically determined during said delivering,
wherein said switching is performed based on measured momentary performance characteristics of at least one of the two or more IP network communication links.

5. The method of claim 1,
wherein said selecting and said applying comprise:
at one or more time-points during packets delivery, (a) determining measured momentary performance characteristics of at least one of said two or more IP network communication links, and (b) dynamically selecting from said plurality of different pre-stored multi-link Packet Distribution Schemes another particular multi-link Packet Distribution Scheme which is sufficiently similar to said measured momentary performance characteristics.

6. The method of claim 1,
wherein the method comprises: transmitting said content item to said recipient device;
wherein the method further comprises:
prior to transmission of said content item to said recipient device, performing a pre-processing stage in which said content item is encoded into two or more encoded-media versions, by utilizing two or more, respective, encoding parameters;
wherein at least one encoded-media version comprises two or more subsets of the packets,
wherein a first subset of the packets is associated with an indication that they are intended to be delivered via a first type of IP communication link,
wherein a second subset of the packets is associated with an indication that they are intended to be delivered via a second, different, type of IP communication link;
wherein said applying comprises: applying said particular multi-link Packet Distribution Scheme which comprises at least (I) a first IP communication link which is of said first type of IP communication link, and (II) a second IP communication link which is of said second type of IP communication link;
wherein said particular multi-link Packet Distribution Scheme is associated with said encoded-media version first subset of said packets; and wherein another multi-link Packet Distribution Scheme is associated with said encoded-media version second subset of packets.

7. The method of claim 1,
wherein the method comprises: transmitting said content item to said recipient device;
wherein the method further comprises:
prior to transmission of said content item to said recipient device, performing a pre-processing stage in which said content item is encoded into two or more encoded-media versions, by utilizing two or more, respective, encoding parameters;
wherein said pre-processing stage further comprises: creating a record that indicates that a first encoded-media version is to be utilized in at least a first particular multi-link Packet Distribution Scheme, and that a second encoded-media version is to be utilized in at least a second particular multi-link Packet Distribution Scheme.

8. The method of claim 1,
wherein said selecting and said applying comprise:
applying said particular multi-link Packet Distribution Scheme which defines a ratio of quantities of said packets that are to be delivered per time-interval via at least one of the IP network communication links to the recipient device.

9. The method of claim 1,
wherein said selecting and said applying comprise:
(a) selecting a first set of IP network communication links for transmitting a first content item to a first recipient device;
(b) selecting a second, at least partially different, set of IP network communication links for delivering the first content item also to a second recipient device, based on an estimation that the first recipient device and the second recipient device are associated with connections that have sufficiently similar performance characteristics for at least part of the duration of packets delivery.

10. The method of claim 1,
wherein said selecting and said applying comprise:
selecting and applying said particular multi-link Packet Distribution Scheme that indicates to deliver to said recipient device (I) some packets of the content item via a connection that includes a cellular communication link, and (II) at least some other packets of the content item via a non-cellular communication link.

11. The method of claim 1,
wherein said selecting and said applying comprise:
selecting and applying said particular multi-link Packet Distribution Scheme that indicates to deliver to said recipient device (I) some packets of the content item via a connection that includes a cellular communication link, and (II) at least some other packets of the content item via a connection to fixed premises of the recipient device over a wired communication link or a satellite communication link or a Wi-Fi communication link.

12. The method of claim 1,
wherein defining a plurality of multi-link Packet Distribution Schemes is performed at a content delivery element of a single Communications Service Provider which operates at least two different networks of two different communication types.

13. The method of claim 1,
wherein inequitably distributing the packets comprises:
inequitably distributing the packets of said content item, for delivery from said delivery device to said recipient device via a plurality of one-to-one IP-based communication links, links.

14. The method of claim 1,
wherein said selecting and said applying are based on estimation of at least one of: (i) jittery behavior characteristics of at least one IP communication link during a particular time-window, (ii) error rate of at least one IP communication link during a particular time-window, (iii) latency of at least one IP communication link during a particular time-window, (iv) bandwidth characteristics of at least one IP communication link during a particular time-window, (v) throughput characteristics of at least one IP communication link during a particular time-window.

15. A method, comprising:
delivering packets of a content item from a delivery device to a recipient device having a recipient Internet Protocol (IP) address, by performing:
inequitably distributing said packets of said content item, for delivery from said delivery device to said recipient device via two or more different Internet Protocol (IP) network communication links,
wherein said distributing of said packets is performed by selecting and applying a particular multi-link Packet Distribution Scheme out of at least two different pre-stored multi-link Packet Distribution Schemes;
wherein said selecting and said applying comprises:
(a) for delivery of a first subset of said packets of said content item to said recipient device, selecting a first particular IP network communication link based on sufficient similarity between (i) at least some of the momentary performance characteristics of said first particular IP communication link and (ii) a corresponding subset of at least some of the momentary performance characteristics of a first IP communication link in said multi-link Packet Distribution Scheme;
(b) for delivery of a second subset of said packets of said content item to said recipient device, selecting a second particular IP network communication link based on sufficient similarity between (I) at least some of the momentary performance characteristics of said second particular IP communication link and (II) a corresponding subset of at least some of the momentary performance characteristics of a second IP communication link in said multi-link Packet Distribution Scheme.

16. A system comprising:

one on more processors, operably associated with one or more memory units;

wherein the one or more processors are configured to deliver packets of a content item from a delivery device to a recipient device having a recipient Internet Protocol (IP) address, by performing:

inequitably distributing said packets of said content item, for delivery from said delivery device to said recipient device via two or more different Internet Protocol (IP) network communication links, wherein said distributing of said packets is performed by selecting and applying a particular multi-link Packet Distribution Scheme out of at least two different pre-stored multi-link Packet Distribution Schemes;

wherein said selecting and said applying comprise:

(a) determining that a first content item is required to be delivered from said delivery device to said recipient device which is a first recipient device, utilizing said particular multi-link Packet Distribution Scheme which comprises at least a first IP communication link and a second IP communication link;

(b) determining that a second content item, which is identical to the first content item or is different from the first content item, is required to be delivered from said delivery device to a second recipient device, utilizing another multi-link Packet Distribution Scheme which comprise at least a third IP communication link and a fourth IP communication link;

(c) determining that performance characteristics of the third IP communication link and the fourth IP communication link are sufficiently similar to performance characteristics of the first IP communication link and the second IP communication link;

(d) based on the determining of step (c), further determining to deliver said second content item to said second recipient device by using the same particular multi-link Packet Distribution Scheme that was used for delivering said first content item to said first recipient device when using said first IP communication link and said second IP communication link.

17. A system comprising:

one on more processors, operably associated with one or more memory units;

wherein the one or more processors are configured to deliver packets of a content item from a delivery device to a recipient device having a recipient Internet Protocol (IP) address, by performing:

inequitably distributing said packets of said content item, for delivery from said delivery device to said recipient device via two or more different Internet Protocol (IP) network communication links, wherein said distributing of said packets is performed by selecting and applying a particular multi-link Packet Distribution Scheme out of at least two different pre-stored multi-link Packet Distribution Schemes;

wherein said selecting and said applying comprises:

(a) for delivery of a first subset of said packets of said content item to said recipient device, selecting a first particular IP network communication link based on sufficient similarity between (i) at least some of the momentary performance characteristics of said first particular IP communication link and (ii) a corresponding subset of at least some of the momentary performance characteristics of a first IP communication link in said multi-link Packet Distribution Scheme;

(b) for delivery of a second subset of said packets of said content item to said recipient device, selecting a second particular IP network communication link based on sufficient similarity between (I) at least some of the momentary performance characteristics of said second particular IP communication link and (II) a corresponding subset of at least some of the momentary performance characteristics of a second IP communication link in said multi-link Packet Distribution Scheme.

* * * * *